(12) United States Patent
Abotabl et al.

(10) Patent No.: US 12,160,397 B2
(45) Date of Patent: Dec. 3, 2024

(54) SOFT-INFORMATION TO HELP BASE STATION WITH DUPLEX CONFIGURATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Ahmed Elshafie, San Diego, CA (US); Abdelrahman Mohamed Ahmed Mohamed Ibrahim, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 17/478,073

(22) Filed: Sep. 17, 2021

(65) Prior Publication Data
US 2023/0091901 A1 Mar. 23, 2023

(51) Int. Cl.
*H04L 5/14* (2006.01)
*H04L 1/18* (2023.01)
*H04L 1/1812* (2023.01)

(52) U.S. Cl.
CPC .............. *H04L 5/14* (2013.01); *H04L 1/1812* (2013.01)

(58) Field of Classification Search
CPC .............. H04B 1/50; H04B 1/56; H04B 1/44; H04B 1/406; H04B 1/10; H04L 5/14; H04L 1/1812
USPC ........................................................ 370/277
See application file for complete search history.

(56) References Cited

U.S. PATENT DOCUMENTS

| | | | | |
|---|---|---|---|---|
| 10,257,818 B2* | 4/2019 | Oketani | ................ | H04L 1/1822 |
| 2009/0268645 A1* | 10/2009 | Chindapol | ............ | H04L 5/0091 |
| | | | | 370/329 |
| 2013/0201884 A1* | 8/2013 | Freda | ................ | H04W 74/0833 |
| | | | | 370/278 |
| 2013/0250772 A1* | 9/2013 | Yin | ........................ | H04L 1/1822 |
| | | | | 370/280 |

(Continued)

FOREIGN PATENT DOCUMENTS

| | | | | |
|---|---|---|---|---|
| EP | 2 744 140 A2 * | 6/2014 | ............... | H04L 1/18 |
| WO | WO 2011/160253 A1 * | 12/2011 | ............... | H04B 7/14 |
| WO | WO 2017/025141 A1 * | 2/2017 | ............... | H04L 1/18 |

*Primary Examiner* — Peter G Solinsky
*Assistant Examiner* — Sanjay K Dewan
(74) *Attorney, Agent, or Firm* — Harrity & Harrity LLP/Qualcomm Incorporated

(57) ABSTRACT

Methods, systems, and devices for wireless communication are described. A user equipment (UE) may monitor for one or more downlink transmissions from a base station based at least in part on a grant identifying resources for the one or more downlink transmissions. The UE may determine feedback information for each of the one or more downlink transmissions based at least in part on the monitoring. The UE may identify, based at least in part on the monitoring, one or more duplexing parameters to be requested to the base station for subsequent communications between the UE and the base station, the one or more duplexing parameters pertaining to operation of the UE in at least one of a full duplex communications mode or a half duplex communications mode. The UE may transmit a feedback message indicating the feedback information and the one or more duplexing parameters to the base station.

30 Claims, 16 Drawing Sheets

(56) References Cited

U.S. PATENT DOCUMENTS

| | | | |
|---|---|---|---|
| 2013/0315109 A1* | 11/2013 | Raaf | H04L 5/0007 370/277 |
| 2014/0192753 A1* | 7/2014 | Jang | H04L 5/0094 370/329 |
| 2019/0306923 A1* | 10/2019 | Xiong | H04J 13/0062 |
| 2022/0231825 A1* | 7/2022 | Kim | H04B 7/063 |
| 2023/0126160 A1* | 4/2023 | Hassan Hussein | H04W 72/541 370/277 |

* cited by examiner

SOFT-INFORMATION TO HELP BASE STATION WITH DUPLEX CONFIGURATION

FIELD OF TECHNOLOGY

The following relates to wireless communication, including the conveying of soft-information to a base station to aid the base station in configuring a duplex configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support the conveying of soft-information to a base station to aid the base station in configuring a duplex configuration. Generally, the described techniques provide for including additional information (e.g., other than a delta modulation and coding scheme (MCS) value) identified for inclusion in Turbo hybrid automatic repeat/request (HARQ) feedback. The types of additional information proposed may be related to various duplexing configurations (such as full duplex and half duplex operations). Examples of the duplexing parameters that are proposed for inclusion in the Turbo HARQ feedback include, but are not limited to, a full duplexing configuration suggested by the user equipment (UE) for subsequent use, gap periods (e.g., uplink/downlink gaps) suggested by the UE for subsequent use, a half duplexing configuration suggested for use, a UE self-interference level suggested for use during full duplex operations, and the like. The UE may include the duplexing parameters in the HARQ feedback message, which the base station may use when scheduling subsequent (re)transmissions.

A method for wireless communication at a UE is described. The method may include monitoring for one or more downlink transmissions from a base station based on a grant identifying resources for the one or more downlink transmissions, determining hybrid automatic repeat request (HARQ) feedback information for each of the one or more downlink transmissions based on the monitoring, identifying, based on the monitoring or the HARQ feedback information, one or more duplexing parameters to be requested to the base station for subsequent communications between the UE and the base station, the one or more duplexing parameters pertaining to operation of the UE in at least one of a full duplex communications mode or a half duplex communications mode, and transmitting a feedback message indicating the HARQ feedback information and the one or more duplexing parameters to the base station.

An apparatus for wireless communication at a UE is described. The apparatus may include a processor, memory coupled with the processor, and instructions stored in the memory. The instructions may be executable by the processor to cause the apparatus to monitor for one or more downlink transmissions from a base station based on a grant identifying resources for the one or more downlink transmissions, determine HARQ feedback information for each of the one or more downlink transmissions based on the monitoring, identify, based on the monitoring or the HARQ feedback information, one or more duplexing parameters to be requested to the base station for subsequent communications between the UE and the base station, the one or more duplexing parameters pertaining to operation of the UE in at least one of a full duplex communications mode or a half duplex communications mode, and transmit a feedback message indicating the HARQ feedback information and the one or more duplexing parameters to the base station.

Another apparatus for wireless communication at a UE is described. The apparatus may include means for monitoring for one or more downlink transmissions from a base station based on a grant identifying resources for the one or more downlink transmissions, means for determining HARQ feedback information for each of the one or more downlink transmissions based on the monitoring, means for identifying, based on the monitoring or the HARQ feedback information, one or more duplexing parameters to be requested to the base station for subsequent communications between the UE and the base station, the one or more duplexing parameters pertaining to operation of the UE in at least one of a full duplex communications mode or a half duplex communications mode, and means for transmitting a feedback message indicating the HARQ feedback information and the one or more duplexing parameters to the base station.

A non-transitory computer-readable medium storing code for wireless communication at a UE is described. The code may include instructions executable by a processor to monitor for one or more downlink transmissions from a base station based on a grant identifying resources for the one or more downlink transmissions, determine HARQ feedback information for each of the one or more downlink transmissions based on the monitoring, identify, based on the monitoring or the HARQ feedback information, one or more duplexing parameters to be requested to the base station for subsequent communications between the UE and the base station, the one or more duplexing parameters pertaining to operation of the UE in at least one of a full duplex communications mode or a half duplex communications mode, and transmit a feedback message indicating the HARQ feedback information and the one or more duplexing parameters to the base station.

In some examples of the method, apparatuses, and non-transitory computer-readable medium described herein, identifying the one or more duplexing parameters may include operations, features, means, or instructions for identifying, based on the monitoring or the feedback information, a full duplex configuration from a set of full duplex configurations to use for the subsequent communications, where the one or more duplexing parameters include the full duplex configuration.

Some examples of the method, apparatuses, and non-transitory computer-readable medium described herein may further include operations, features, means, or instructions for receiving, from the base station, control signaling indicating the set of full duplex configurations.

In some examples of the method, apparatuses, and non-transitory computer-readable medium described herein, identifying the one or more duplexing parameters may include operations, features, means, or instructions for identifying, based on the monitoring or the feedback information, one or more gap periods between a second one or more downlink transmissions and one or more uplink transmissions, where the one or more duplexing parameters include the one or more gap periods.

In some examples of the method, apparatuses, and non-transitory computer-readable medium described herein, identifying the one or more duplexing parameters may include operations, features, means, or instructions for determining, based on the monitoring or the feedback information, that the subsequent communications do not support full duplex communications and identifying a half duplexing configuration for the subsequent communications, where the one or more duplexing parameters include the half duplex configuration.

In some examples of the method, apparatuses, and non-transitory computer-readable medium described herein, identifying the one or more duplexing parameters may include operations, features, means, or instructions for identifying a self-interference level associated with the UE performing one or more uplink transmissions concurrently with monitoring for the one or more downlink transmissions, where the one or more duplexing parameters include the self-interference level.

Some examples of the method, apparatuses, and non-transitory computer-readable medium described herein may further include operations, features, means, or instructions for identifying a MCS, a resource block allocation value, or both, for one or more of a full duplexing configuration, one or more gap periods, a half duplexing configuration, a self-interference value, or a combination thereof, where the feedback message indicates the MCS, the resource block allocation value, or both.

In some examples of the method, apparatuses, and non-transitory computer-readable medium described herein, identifying the one or more duplexing parameters may include operations, features, means, or instructions for receiving an indication of a set of configurations available for use for the subsequent communications and selecting a configuration from the set of configurations based on the monitoring or the feedback information, where the one or more duplexing parameters include the configuration from the set of configurations.

In some examples of the method, apparatuses, and non-transitory computer-readable medium described herein, the set of configurations include a first subset of configurations associated with the feedback information including a negative-acknowledgement indication for the one or more downlink transmissions and a second subset of configurations associated with the feedback information including an acknowledgement indication for the one or more downlink transmissions.

In some examples of the method, apparatuses, and non-transitory computer-readable medium described herein, the indication may be received in a radio resource control (RRC) message, a medium access control (MAC) control element (CE), a downlink control information (DCI) message, or a combination thereof.

In some examples of the method, apparatuses, and non-transitory computer-readable medium described herein, each configuration in the set of configurations include a full duplexing configuration, one or more gap periods, a half duplexing configuration, a self-interference value, or a combination thereof.

In some examples of the method, apparatuses, and non-transitory computer-readable medium described herein, the subsequent communications include a retransmission of the one or more downlink transmissions or a second one or more downlink transmissions.

A method for wireless communication at a base station is described. The method may include transmitting, to a UE, one or more downlink transmissions based on a grant identifying resources for the one or more downlink transmissions, receiving, from the UE, a feedback message indicating HARQ feedback information for each of the one or more downlink transmissions, the feedback message also including one or more duplexing parameters pertaining to operation of the UE in at least one of a full duplex communications mode or a half duplex communications mode, and transmitting subsequent communications to the UE based on the one or more duplexing parameters.

An apparatus for wireless communication at a base station is described. The apparatus may include a processor, memory coupled with the processor, and instructions stored in the memory. The instructions may be executable by the processor to cause the apparatus to transmit, to a UE, one or more downlink transmissions based on a grant identifying resources for the one or more downlink transmissions, receive, from the UE, a feedback message indicating HARQ feedback information for each of the one or more downlink transmissions, the feedback message also including one or more duplexing parameters pertaining to operation of the UE in at least one of a full duplex communications mode or a half duplex communications mode, and transmit subsequent communications to the UE based on the one or more duplexing parameters.

Another apparatus for wireless communication at a base station is described. The apparatus may include means for transmitting, to a UE, one or more downlink transmissions based on a grant identifying resources for the one or more downlink transmissions, means for receiving, from the UE, a feedback message indicating HARQ feedback information for each of the one or more downlink transmissions, the feedback message also including one or more duplexing parameters pertaining to operation of the UE in at least one of a full duplex communications mode or a half duplex communications mode, and means for transmitting subsequent communications to the UE based on the one or more duplexing parameters.

A non-transitory computer-readable medium storing code for wireless communication at a base station is described. The code may include instructions executable by a processor to transmit, to a UE, one or more downlink transmissions based on a grant identifying resources for the one or more downlink transmissions, receive, from the UE, a feedback message indicating HARQ feedback information for each of the one or more downlink transmissions, the feedback message also including one or more duplexing parameters pertaining to operation of the UE in at least one of a full duplex communications mode or a half duplex communications mode, and transmit subsequent communications to the UE based on the one or more duplexing parameters.

Some examples of the method, apparatuses, and non-transitory computer-readable medium described herein may further include operations, features, means, or instructions for identifying, based on the feedback message, a full duplex configuration from a set of full duplex configurations to use for the subsequent communications, where the one or more duplexing parameters include the full duplex configuration.

Some examples of the method, apparatuses, and non-transitory computer-readable medium described herein may further include operations, features, means, or instructions for transmitting, to the UE, control signaling indicating the set of full duplex configurations.

Some examples of the method, apparatuses, and non-transitory computer-readable medium described herein may further include operations, features, means, or instructions for identifying, based on the feedback message, one or more gap periods between a second one or more downlink transmissions and one or more uplink transmissions from the UE, where the one or more duplexing parameters include the one or more gap periods.

Some examples of the method, apparatuses, and non-transitory computer-readable medium described herein may further include operations, features, means, or instructions for determining, based on the feedback message, that the subsequent communications do not support full duplex communications and identifying a half duplexing configuration for the subsequent communications.

Some examples of the method, apparatuses, and non-transitory computer-readable medium described herein may further include operations, features, means, or instructions for identifying, based on the feedback message, a self-interference level associated with the UE performing one or more uplink transmissions concurrently with monitoring for the one or more downlink transmissions.

Some examples of the method, apparatuses, and non-transitory computer-readable medium described herein may further include operations, features, means, or instructions for identifying, based on the feedback message, a MCS, a resource block allocation value, or both, for one or more of full duplexing configurations, one or more gap periods, one or more half duplexing configurations, a self-interference value, or a combination thereof.

Some examples of the method, apparatuses, and non-transitory computer-readable medium described herein may further include operations, features, means, or instructions for identifying a set of configurations available for the UE to use for the subsequent communications and transmitting an indication of the set of configurations available for use for the subsequent communications, where the feedback message indicates a configuration from the set of configurations.

In some examples of the method, apparatuses, and non-transitory computer-readable medium described herein, the set of configurations include a first subset of configurations associated with the feedback information including a negative-acknowledgement indication for the one or more downlink transmissions and a second subset of configurations associated with the feedback information including an acknowledgement indication for the one or more downlink transmissions.

In some examples of the method, apparatuses, and non-transitory computer-readable medium described herein, the indication may be transmitted in an RRC message, a MAC CE, a DCI message, or a combination thereof.

In some examples of the method, apparatuses, and non-transitory computer-readable medium described herein, each configuration in the set of configurations include a full duplexing configuration, one or more gap periods, a half duplexing configuration, a self-interference value, or a combination thereof.

In some examples of the method, apparatuses, and non-transitory computer-readable medium described herein, the subsequent communications include a retransmission of the one or more downlink transmissions or a second one or more downlink transmissions.

DETAILED DESCRIPTION

Wireless communications systems may support hybrid automatic repeat request (HARQ) feedback protocols where a user equipment (UE) transmits feedback messages indicating whether the UE was able to successfully receive and decode downlink transmissions. Based on the feedback message, the base station either considers the transmission a success (if the feedback message indicates an acknowledgment (ACK)) or may determine that the transmission is to be resent (if the feedback message indicates a negative acknowledgment (NACK)). Some networks also allow the UE to report additional feedback information along with an ACK or NACK. The process of reporting additional feedback information with the ACK/NACK is sometimes referred to as Turbo HARQ feedback, or multiple bit feedback. In Turbo HARQ feedback, the additional feedback that has previously been discussed includes a preferred modulation and coding scheme (MCS) value for subsequent downlink (re)transmissions in order to improve performance of those downlink (re)transmissions. However, it may be advantageous for the UE to be able to signal other additional information in the Turbo HARQ feedback.

Generally, the described techniques provide for including additional information (e.g., other than a delta MCS value) identified for inclusion in Turbo HARQ feedback. The types of additional information proposed may be related to various duplexing configurations (such as full duplex and half duplex operations). Examples of the duplexing parameters that are proposed for inclusion in the Turbo HARQ feedback include, but are not limited to, a full duplexing configuration suggested by the UE for subsequent use, gap periods (e.g., uplink/downlink gaps) suggested by the UE for subsequent use, a half duplexing configuration suggested for use, a UE self-interference level suggested for use during full duplex operations, and the like. The UE may include the duplexing parameters in the HARQ-ACK feedback message, which the base station may use when scheduling subsequent (re) transmissions.

Aspects of the disclosure are initially described in the context of wireless communications systems. Aspects of the disclosure are further illustrated by and described with reference to apparatus diagrams, system diagrams, and flowcharts that relate to the conveying of soft-information to a base station to aid the base station in configuring a duplex configuration.

Figure 1:
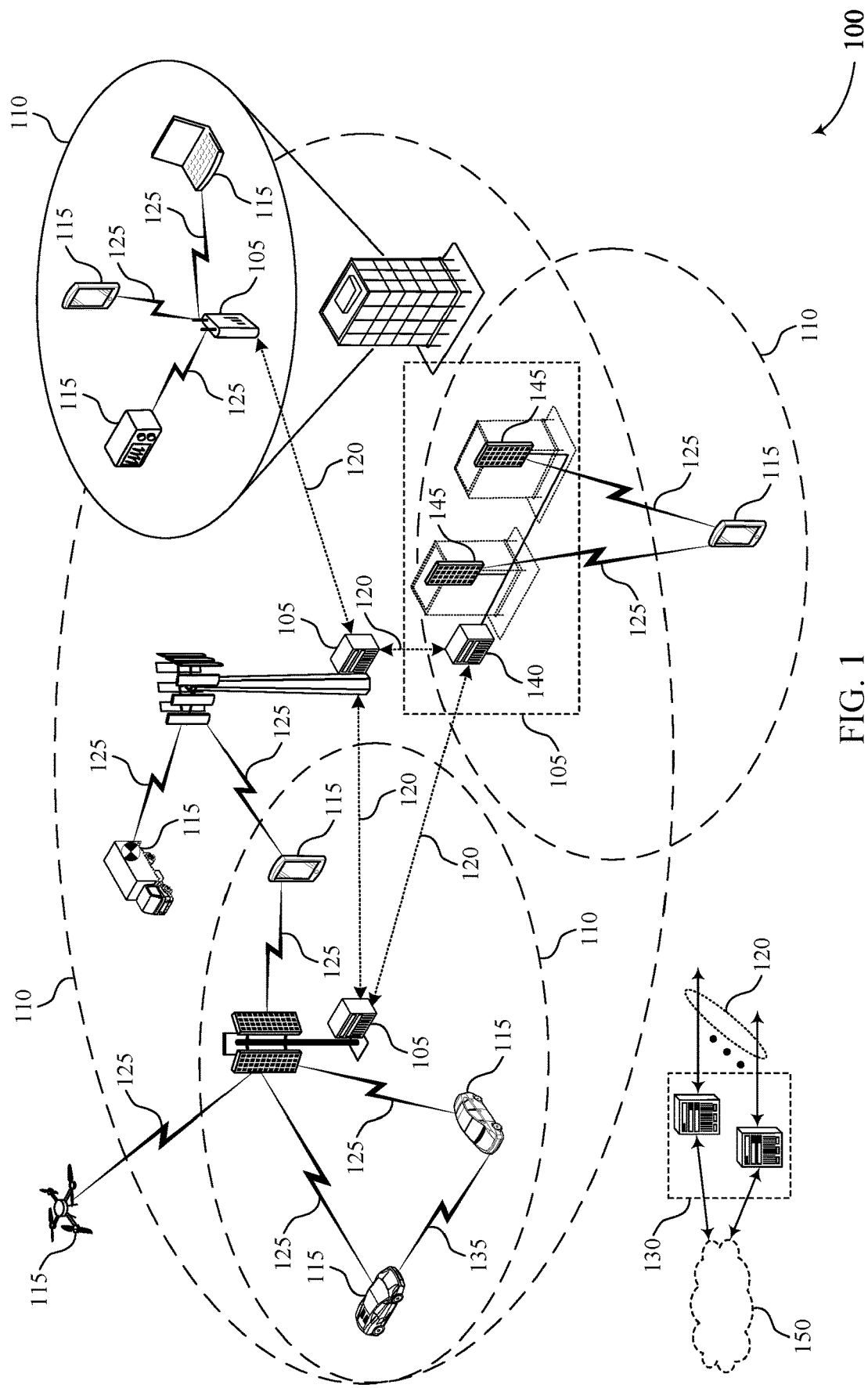
FIG. 1 illustrates an example of a wireless communications system that supports the conveying of soft-information to a base station to aid the base station in configuring a duplex configuration in accordance with aspects of the present disclosure.

FIG. 1 illustrates an example of a wireless communications system 100 that supports the conveying of soft-information to a base station to aid the base station in configuring a duplex configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others).

In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half duplex communications (e.g., a mode that supports one-way communication via transmission or reception, but not transmission and reception simultaneously). In some examples, half duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may monitor for one or more downlink messages from a base station 105 based at least in part on a grant identifying resources for the one or more downlink messages. The UE 115 may determine feedback information for each of the one or more downlink messages based at least in part on the monitoring. For example, the UE 115 may monitor for the scheduled downlink message or messages, but because of changing channel conditions (e.g., the UE 115 enters a tunnel), the UE 115 may not be able to receive the scheduled downlink message. In this case, the UE 115 would determine a NACK. Alternatively, as a result of the monitoring, the UE 115 may receive the scheduled downlink message but may be unable to decode the message. In this case, a NACK would also be determined. Or, as a result of the monitoring, the UE 115 may both receive and successfully decode the scheduled downlink message, allowing the UE 115 to determine an ACK. The UE 115 may then identify, based at least in part on the monitoring, one or more duplexing parameters to be requested to the base station 105 for subsequent communications between the UE 115 and the base station 105, the one or more duplexing parameters pertaining to a configuration of the UE 115 to operate in a full duplex communications mode or a half duplex communications mode. The UE 115 may transmit a feedback message indicating the feedback information and the one or more duplexing parameters to the base station 105.

A base station 105 may transmit, to a UE 115, one or more downlink messages based at least in part on a grant identifying resources for the one or more downlink messages. The base station 105 may receive, from the UE 115, a feedback message indicating feedback information for each of the one or more downlink messages, the feedback message also including one or more duplexing parameters pertaining to a configuration of the UE 115 to operate in a full duplex communications mode or a half duplex communications mode. The base station 105 may transmit subsequent communications to the UE 115 based at least in part on the one or more duplexing parameters.

Figure 2:
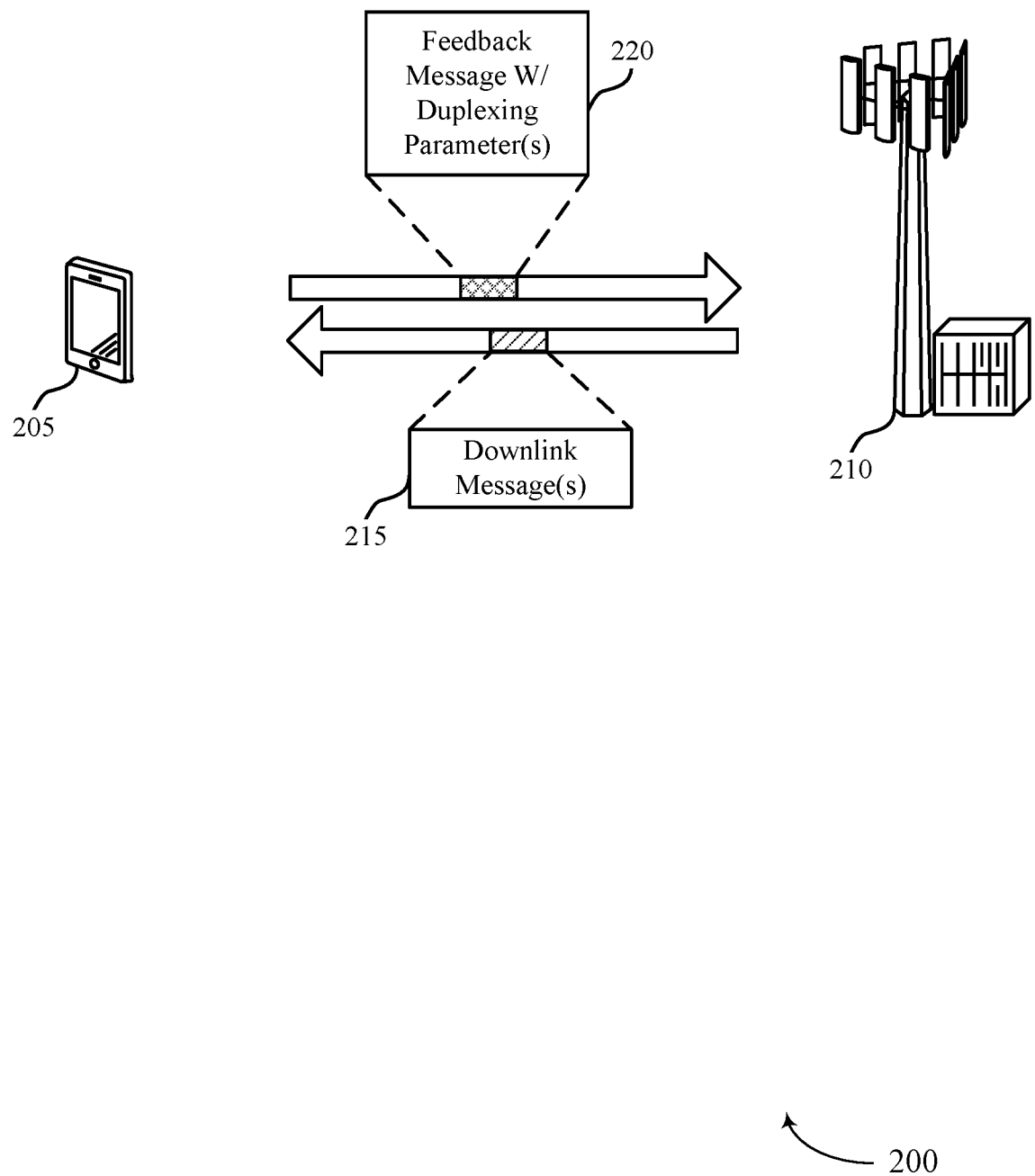
FIG. 2 illustrates an example of a wireless communications system that supports the conveying of soft-information to a base station to aid the base station in configuring a duplex configuration in accordance with aspects of the present disclosure.

FIG. 2 illustrates an example of a wireless communications system 200 that supports soft-information to help base station 210 with duplex configuration in accordance with aspects of the present disclosure. Wireless communications system 200 may implement aspects of wireless communications system 100. Wireless communications system 200 may include UE 205 and/or base station 210, which may be examples of the corresponding devices described herein. In some aspects, UE 205 and base station 210 may be configured to perform or otherwise support half duplex communications and/or full duplex communications.

As discussed above, a UE (such as UE 205) may transmit a feedback message 220 in response to a downlink message 215. The feedback message 220 may include a single bit of feedback per transport block (TB) or per codeblock group (CBG) for the downlink message 215. Alternatively, the feedback message 220 may include multiple bits per TB or CBG. For example, the multi-bit feedback may indicate a one-bit ACK/NACK in addition to one or more bits to indicate additional information, for example, related to channel state information (CSI). Such multi-bit feedback (e.g., including ACK/NACK and additional information) may be referred to as turbo-HARQ or some other terminology (such as multi-bit feedback). In some cases, feedback for multiple downlink messages 215 may be transmitted via the same uplink resource, and the UE 205 may generate a codebook corresponding to the multiple downlink messages. The UE 205 may use the codebook to multiplex the feedback into a single uplink message. The UE 215 may simultaneously support two codebooks that each correspond to one of a first or a second TRP, or to high priority traffic or low priority traffic.

For example, this may include UE 205 supporting one (e.g., a single) HARQ-ACK codebook. The codebook can be a type 1 codebook or type 2 codebook. Broadly, CBG vs TB based physical downlink shared channel (PDSCH) may, at least in some aspects, use different HARQ-ACK subcodebooks. That is, the codebook may include two subcodebooks, with one subcodebook being for TB based PDSCH and the other subcodebook being for CBG based PDSCH. For a type 2 codebook, UE 205 supporting simultaneous CBG and TB based PDSCH may use two downlink assignment indicator (DAI) pairs (e.g., a counter-DAI_CBG/total_DAI_CBG pair and a counter_DAI_TB/total_DAI_TB pair). In some aspects, a single TB PDSCH vs two TB PDSCH (where the TB may also be referred to as a codeword (CW) in some examples) may use the same HARQ-ACK subcodebook and the same DAI pair (e.g., for a type 2 codebook). For the type 2 codebook, if an active component carrier (CC) is configured to support two TB, then the PDSCH on all active CCs may assume two-bit ACK/NACK feedback when constructing the HAR-ACK subcodebook. In some examples for the type 2 codebook, the one TB vs two TB PDSCH may use different subcodebooks and different DAI pairs. This may result in 2×2=4 subcodebooks and four independent DAIS pairs being used (e.g., to avoid complexity).

For UE 205 to support certain traffic types (e.g., URLLC plus eMBB services), two HARQ-ACK codebooks may be used. One codebook may be associated with high priority (HP) traffic while the other codebook may be associated with low priority (LP) traffic. For UE 205 to support multiple TRP-based traffic, again two codebooks may be used. One codebook for HARQ-ACK feedback for TRP1 and another codebook for HARQ-ACK feedback for TRP2. In some examples, supporting certain traffic types (e.g., URLLC plus eMBB) in addition to multiple TRPs may result in UE 205 using four codebooks in its feedback. However, this may impose an increased processing/complexity burden on UE 205 and/or base station 210, which may be undesirable. Accordingly, UE 205 may simultaneously support up to two codebooks (comprising four subcodebooks, with each subcodebook comprising two subsubcodebooks), where four independent DAI pairs are used for a type 2 codebook. Again, current techniques do not support codebook structures for multiplexing multi-bit feedback with single-bit feedback by UE 205.

For example, for each TB of a PDSCH (e.g., each TB of a downlink message 215) UE 205 may feed back multiple bits in the feedback message 220 to provide additional information in addition to the one-bit ACK/NACK for the PDSCH. Examples of the additional information include, but are not limited to, the delta MCS for a TB received with an MCS index I_MCS. In some aspects, the delta MCS may be calculated from the difference between a target MCS (I_MCS_tgt) and the MCS used for the downlink transmission (I_MCS). Broadly, the target MCS (I_MCS_tgt) may correspond to the largest MCS index such that the estimated block level error rate (BLER) for a TB received with a MCS index (I_MCS) would be smaller than or equal to a BLER target. Again, I_MCS may correspond to the MCS index of the received TB.

One example of how to extend the 1-bit feedback using two bits may include, but are not limited to, an ACK with the delta MCS+X (with respect to the MCS of the current PDSCH TB), where the X corresponds to an integer number indicating the change in the current MCS index to a target MCS index being X (e.g., from MCS index 4 to MCS index 6, where X would be two in this example). This may convey an indication that, although UE 205 was able to successfully receive and decode the TB, the channel conditions are such that subsequent downlink messages would benefit from using a different MCS index. Another example may include an ACK with a delta MCS+0 (again with respect to the MCS of the current PDSCH TB). This may indicate that the channel conditions are such that no change to the current PDSCH TB MCS is needed. Another example may include a NACK with delta MCS−0. This may indicate that, although UE 205 was not able to successfully receive and decode the TB, the channel conditions are such that no change to the current PDSCH TB MCS index is needed (e.g., in the situation where something other than the channel conditions caused UE 205 to be unable to successfully receive and decode the downlink message). Yet another example may include a NACK with delta MCS-Y (also with respect to the current PDSCH TB). This may indicate that UE 205 was unable to successfully receive and decode the downlink message, and therefore the channel conditions are such that a lower MCS index value (e.g., corresponding to, or otherwise based on, Y) may be needed for subsequent downlink messages.

Accordingly, wireless communications system 200 may support CSI feedback/enhancements. This may include an increase in the number of bits used in the feedback for reported duplexing configurations. This may support and/or leverage turbo HARQ where the delta duplexing parameters are derived or otherwise determined based on PDSCH decoding. However, multiplexing single-bit (1-bit) and multi-bit HARQ-ACK feedback is not supported in some wireless communications systems.

Accordingly, aspects of the described techniques provide for multiplexing duplexing information (e.g., parameter(s)) in feedback message 220. That is, base station 210 and UE 205 may be performing wireless communications using half and/or full duplexing techniques. For example, the half duplexing techniques may include base station 210 performing transmissions to UE 205 while UE 205 is not performing wireless transmissions (e.g., while monitoring for the downlink transmissions), or vice versa.

The full duplexing techniques may include base station 210 performing transmissions to UE 205 while UE 205 is also performing transmissions (e.g., to base station 210 or another wireless node). For example, UE 205 may be performing a wireless transmission to base station 210 using a transmit chain that is separate from a receive chain being used to concurrently monitor for a wireless transmission from base station 210.

Some wireless communications may be associated with stringent latency and/or reliability requirements (e.g., URLLC). In such scenarios, base station 210 may attempt to deliver the URLLC packets as reliable as possible. Accordingly, it may be beneficial for base station 210 to change, updated, etc., various parameters associated with the full duplex and/or half duplex communications. For example, it may be beneficial (e.g., improve communications, reduce latency, conserve over-the-air resources, and the like) if base station 210 were able to change the gap period between uplink and downlink in (re)transmissions, to use a different full duplexing configuration, to switch between full duplexing to half duplexing techniques, or vice versa, and the like. Accordingly, aspects of the techniques described herein may include UE 205, as part of the HARQ-ACK feedback for a packet, indicating, suggesting, requesting, etc., various duplexing parameters to base station 210.

For example, UE 205 and base station 210 may be performing wireless communications (e.g., full duplex-based communications, half duplex-based communications, beamformed communications, non-beamformed communications, and the like). This may include UE 205 monitoring for downlink message(s) 215 from base station 210. The monitoring may be based, at least in some aspects, on grant(s) identifying resources for the downlink message(s) 215. For example, base station 210 may transmit or otherwise provide a downlink control information (DCI) grant carrying or otherwise indicating the resources for the downlink message(s) 215. The DCI grant may be a grant dynamically scheduling the downlink message(s) 215 and identify the allocated resources and/or may be an activating DCI that identifies semi-persistent scheduling (SPS) resources to be used for the downlink message(s).

UE 205 may identify or otherwise determine feedback information for each of the downlink message(s) 215 based on the monitoring. For example, UE 205 may determine whether each downlink message 215 is able to be successfully received and decoded. When operating in acknowledgement mode (AM), UE 205 may generate a codebook that includes bit(s) associated with each downlink message 215 that indicates, for that downlink message 215, whether UE 215 was able to successfully receive and decode the downlink message 215. For example, UE 215 may insert a "1" bit into the codebook for a downlink message 215 that was successfully received and decoded and insert a "0" bit into the codebook for a downlink message 215 that was not successfully received and decoded, or vice versa. Accordingly, UE 205 may generate the codebook conveying the feedback information for each downlink message 215. UE 205 may include the codebook conveying the feedback information for the downlink message(s) 215 in the feedback message 220 transmitted to base station 210.

UE 205 may also identify or otherwise determine duplexing parameter(s) based on monitoring for the downlink message(s) 215. That is, UE 205 may measure, identify, or otherwise determine various performance metrics associated with the downlink message(s) 215 received from base station 210. The performance metrics may be based on various channel performance metrics associated with the channel between UE 205 and base station 210 (e.g., reference signal received power (RSRP), reference signal strength indicator (RSSI), channel quality indicator (CQI), channel state information (CSI), interference, throughput rate, BLER, and the like). UE 205 may identify or determine such performance metrics based on its attempts to receive and decode the downlink message(s) 215 (e.g., based on the success ration, feedback information, etc.). In some aspects, UE 205 may identify such performance metrics and use this information to select, identify, or otherwise determine duplexing parameter(s) to request base station 210 implement in order to improve subsequent communications.

That is, the duplexing parameters may be associated with a configuration used to operate in a full duplex communication mode and/or a half duplex communications mode. The full duplex communication mode may include a mode where UE 205 is performing full duplex communications with base station 210 according to a full duplex configuration. The half duplex communication mode may include a mode where UE 205 is performing half duplex communications with base station 210 according to a half duplex configuration. That is, each full and/or half duplex configuration may include various parameters used to define how such communications are to occur. Examples of such parameters include, but are not limited to, a specific full and/or half duplexing configuration from among a set of (pre)configured full and/or half duplexing configurations, the gap period (e.g., switching period) associated with transitions between uplink and downlink communications (or vice versa), switching between full duplex and half duplex communications (or vice versa), and the like. In some examples, the parameters may be based on a self-interference level/value detected/observed by UE 20 during reception of the downlink message(s) 215 (e.g., the corresponding PDSCH). For example, UE 205 may be operating according to a full duplexing configuration where UE 205 receives downlink message(s) 215 while simultaneously transmits uplink (or sidelink) transmissions. The uplink (or sidelink) transmissions from the antenna(s) of UE 205 may interfere with UE 205 receiving the downlink message(s) 215 (e.g., self-interference). In some examples, UE may use one, some, or all of the example parameters discussed above to select, identify, or otherwise determine, a MCS and/or resource block allocation that would improve subsequent (re)transmissions. For example, UE 205 may include a request for a particular MCS and/or resource block allocation with each updated duplexing parameter included in feedback message 220. Accordingly, UE 205 may transmit the feedback message 220 to base station 210 indicating the feedback information as well as the duplexing parameter(s). Base station 210 may identify the duplexing parameter(s) indicated in the feedback message 220 and make scheduling decisions for subsequent communications accordingly.

More particularly, UE 205 may select, identify, or otherwise determine a full duplex configuration from a set of (pre)configured full duplex configurations to use for the subsequent communications. That is, base station 210 may transmit or otherwise provide (and UE 205 may receive or otherwise obtain) control signaling (e.g., RRC) indicating a set of full duplex configurations. Each full duplex configuration in the set may be associated with a specific identifier, index, etc. Based on monitoring for the downlink message(s) 215 and/or the corresponding feedback information (e.g., the codebook), UE 205 may determine that a different full duplex configuration would be better suited to support full duplexing communications with base station 210 (e.g., based on the observed channel performance metrics). Accordingly, UE 205 may select the different full duplex configuration from the set. In this context, the duplexing parameter(s) may be or at least include the identifier or index of the different full duplex configuration selected by UE 205. Accordingly, in this example UE 205 may select a full duplex configuration from multiple semi-static full duplex configurations (when so (pre)configured) and suggest/request the index of the desired full duplex configuration(s). Base station 210 may identify or otherwise determine the requested full duplex configuration based on the duplexing parameters (e.g., the identifier or index) indicated in the feedback message 220.

In another example, UE 205 may select, identify, or otherwise determine gap period(s) between additional downlink message(s) and uplink transmission(s). Each gap period may be associated with a time period (e.g., one or more symbols) in which UE 205 transitions from a downlink communication mode to an uplink communication mode, or vice versa, which may include retuning various components, activating/deactivating various components, and the like. UE 205 may observe the gap periods associated with receiving the downlink message(s) 215 and determine that subsequent communications may benefit from using different gap periods (e.g., may improve latency and/or reliability). Accordingly, in this example UE 205 may select gap periods or a set of potential gap periods and suggest/request the gap periods (e.g., using bit(s), field(s), etc., identifying the suggested/requested gap periods) in the duplexing parameters included in the feedback message 220. Base station 210 may identify or otherwise determine the requested gap period or set of gap periods based on the duplexing parameters indicated in the feedback message 220.

In another example, UE 205 may select, identify, or otherwise determine that subsequent communications may not support full duplex communications. For example, UE 205 may determine that the full duplex configuration currently being used is not supported by the observed channel performance metrics. Accordingly, UE 205 may determine that subsequent communications may be improved by switching to half duplexing communications. Accordingly, in this example UE 205 may select, identify, or otherwise determine a half duplex configuration to be used for subsequent communications. In this example, UE 205 may suggest/request half duplexing communications by indicating the half duplex configuration in the duplexing parameter(s) indicated in the feedback message 220. For example, UE 205 may include an identifier or index associated with a specific half duplex configuration and/or may simply include a flag indicating that half duplex communications are being requested. Base station 210 may identify or otherwise determine the requested half duplexing communications based on the duplexing parameters indicated in the feedback message 220.

In another example, UE 205 may measure, identify, or otherwise determine a self-interference level associated with UE 205 performing uplink transmission(s) while concurrently monitoring for the downlink message(s) 215. That is, UE 205 may measure or otherwise determine its self-interference value during reception of the corresponding PDSCH. In this example, UE 205 may identify or otherwise indicate its self-interference level in the in the duplexing parameter(s) indicated in the feedback message 220. For example, UE 205 may include an value or range associated with a specific self-interference level and/or may simply include a flag indicating that self-interference level has reached a threshold. Base station 210 may identify or otherwise determine the self-interference level of UE 205 based on the duplexing parameters indicated in the feedback message 220.

As discussed above, in some examples UE 205 may select, identify, or otherwise determine a requested MCS (e.g., delta MCS) and/or resource block allocation to be included in the duplexing parameters indicated in the feedback message 220 for each of the duplexing parameters discussed above. For example, UE 205 may identify the MCS/resource block allocation for each requested full duplex configuration, each gap period, half duplex configuration, self-interference value, etc. In this example, UE 205 may suggest/request the MCS/resource block allocation per-duplexing parameter by indicating the MCS/resource block allocation in the duplexing parameter(s) indicated in the feedback message 220. Base station 210 may identify or otherwise determine the requested MCS/resource block allocation for one, some or all the other indicated duplexing parameters based on the duplexing parameters indicated in the feedback message 220.

As discussed above, in some examples UE 205 may be configured with a set of full duplex configurations and/or half duplex configurations that may be used for the subsequent communications. For example, base station 210 may transmit or otherwise provide (and UE 205 may receive or otherwise obtain) a set of configurations that UE 205 can select from and signal in the physical uplink control channel (PUCCH) (e.g., feedback message 220) along with the HARQ-ACK (e.g., feedback information). Accordingly, UE 205 may select a configuration from the set of configurations and include or otherwise convey an indication of the selected configuration in the duplexing parameters indicated in feedback message 220. Base station 210 may use RRC signaling, a MAC CE message, and/or a DCI to configure UE 205 with the set of configurations. In some examples, the set of configurations may include different full duplexing configurations, different gap periods, different half duplex configurations, and the like.

In some examples, base station 210 may configure UE 205 with the set of configurations where some configurations are associated with a particular HARQ-ACK feedback. For example, base station 210 may configure UE 205 with a first full duplex configuration and a second full duplex configuration (or more than two full duplex configurations) that can be suggested/requested in the duplexing parameters when NACK is indicated in the feedback information. Base station 210 may configure UE 205 with a third full duplex configuration and a fourth full duplex configuration (or more than two full duplex configurations) that can be suggested/requested in the duplexing parameters when ACK is indicated in the feedback information. Similarly, multiple configurations may be provided for each of the half duplexing configurations, gap periods, self-interference levels, and the like, that are associated with NACK or ACK indications in the HARQ-ACK codebook. Accordingly, UE 205 may select a configuration from the ACK-based full duplex configurations when the feedback information indicates an ACK or a configuration from the NACK-based full duplex configurations when the feedback information indicates a NACK.

Accordingly, the described techniques provide various mechanisms that may be applied—alone or in any combination—to improve subsequent communications between UE 205 and base station 210 using duplexing parameter(s) multiplexed into, or otherwise communicated along with, the feedback information. Base station 210 may recover the suggested/requested duplexing parameters from the feedback message 220 and improve scheduling decisions for subsequent communications.

Figure 3:
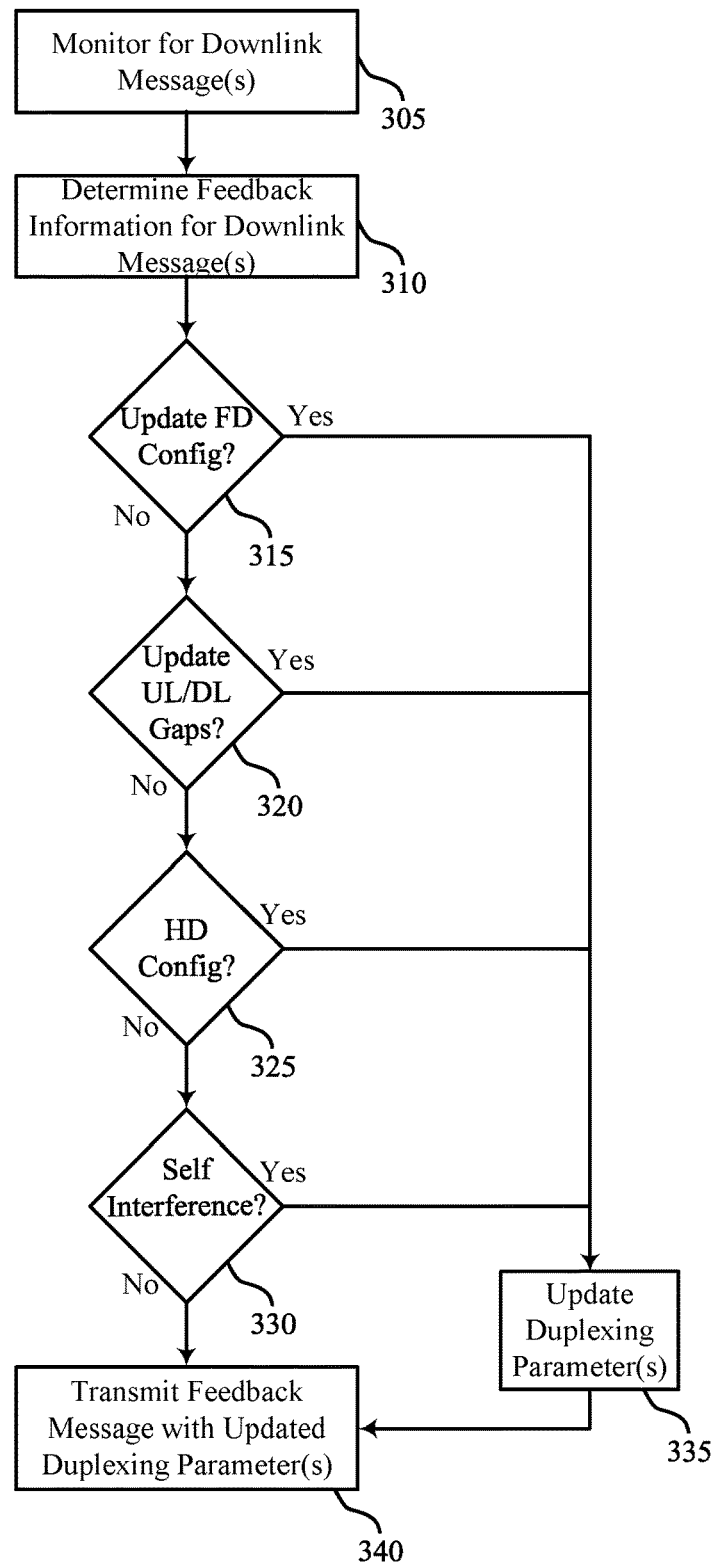
FIG. 3 illustrates an example of a method that supports the conveying of soft-information to a base station to aid the base station in configuring a duplex configuration in accordance with aspects of the present disclosure.

FIG. 3 illustrates an example of a method 300 that supports the conveying of soft-information to a base station to aid the base station in configuring a duplex configuration in accordance with aspects of the present disclosure. Method 300 may implement, or be implemented by, aspects of wireless communications systems 100 and/or 200. Aspects of method 300 may be implemented at or implemented by a UE and/or base station, which may be examples of the corresponding devices described herein.

At 305, a UE may monitor for downlink message(s) from a base station. For example, the UE may receive one or more DCI grants identifying resources for the downlink message(s) (e.g., indicating the resources and/or activating the resources). The UE may monitor those resources to attempt to receive and decode the downlink message(s).

At 310, the UE may determine the feedback information for the downlink message(s). For example, the feedback information may include or otherwise be based on a codebook (e.g., a type 1 or type 2 HARQ-ACK codebook). The codebook may include a bitmap of bits where each bit indicates ACK or NACK for a corresponding downlink message of the downlink message(s).

At 315, the UE may identify or otherwise determine whether a new, different, or updated full duplex configuration is warranted for subsequent communications. For example, the UE may use the feedback information (e.g., whether ACK or NACK is indicated and/or based on channel performance metrics observed when receiving and attempting to decode the downlink message(s)) to determine whether the current full duplex configuration is acceptable (e.g., satisfies a performance threshold) or otherwise optimal for the subsequent communications. If yes (e.g., an updated or different full duplex configuration is warranted), at 335 the UE may identify the full duplex configuration (e.g., the updated full duplex configuration) from a set of full duplex configurations. The UE may generate a duplexing parameter corresponding to the updated full duplex configuration to be included in a feedback message provided to the base station.

If no (e.g., an updated or different full duplex configuration is not warranted), at 320 the UE may identify or otherwise determine whether a new, different, or updated gap period(s) is/are warranted for subsequent communications. For example, the UE may use the feedback information to determine whether the current gap period(s) is/are acceptable (e.g., satisfies a performance threshold) or otherwise optimal for the subsequent communications. If yes (e.g., an updated or different gap period(s) is warranted), at 335 the UE may identify the gap period(s) (e.g., the updated gap period(s)). The UE may generate a duplexing parameter corresponding to the updated gap period(s) to be included in a feedback message provided to the base station.

If no (e.g., an updated or different full duplex gap period(s) is/are not warranted), at 325 the UE may identify or otherwise determine whether a half duplexing configuration is warranted for subsequent communications. For example, the UE may use the feedback information to determine whether the current full duplexing configuration is acceptable (e.g., satisfies a performance threshold) or otherwise optimal for the subsequent communications. If yes (e.g., a half duplexing configuration is warranted), at 335 the UE may identify the half duplexing configuration. The UE may generate a duplexing parameter corresponding to the half duplexing configuration to be included in a feedback message provided to the base station.

If no (e.g., a half duplex configuration is not warranted), at 330 the UE may identify or otherwise determine a self-interference value/level associated with receiving the downlink message(s). For example, the UE may measure or otherwise observe its self-interference value/level while receiving and decoding the downlink message(s). If yes (e.g., a self-interference value/level is observed and/or satisfies a threshold), at 335 the UE may identify the self-interference value/level. The UE may generate a duplexing parameter corresponding to the self-interference level of the UE to be included in a feedback message provided to the base station.

At 340, the UE may transmit the feedback message to the base station. The feedback message may carry or otherwise convey an indication of the feedback information (e.g., the HARQ-ACK codebook) as well as the duplexing parameter(s). For example, the UE may multiplex the duplexing parameter(s) with the feedback information within the PUCCH transmission and/or separately indicate the duplexing parameter(s) in the feedback message.

Figure 4:
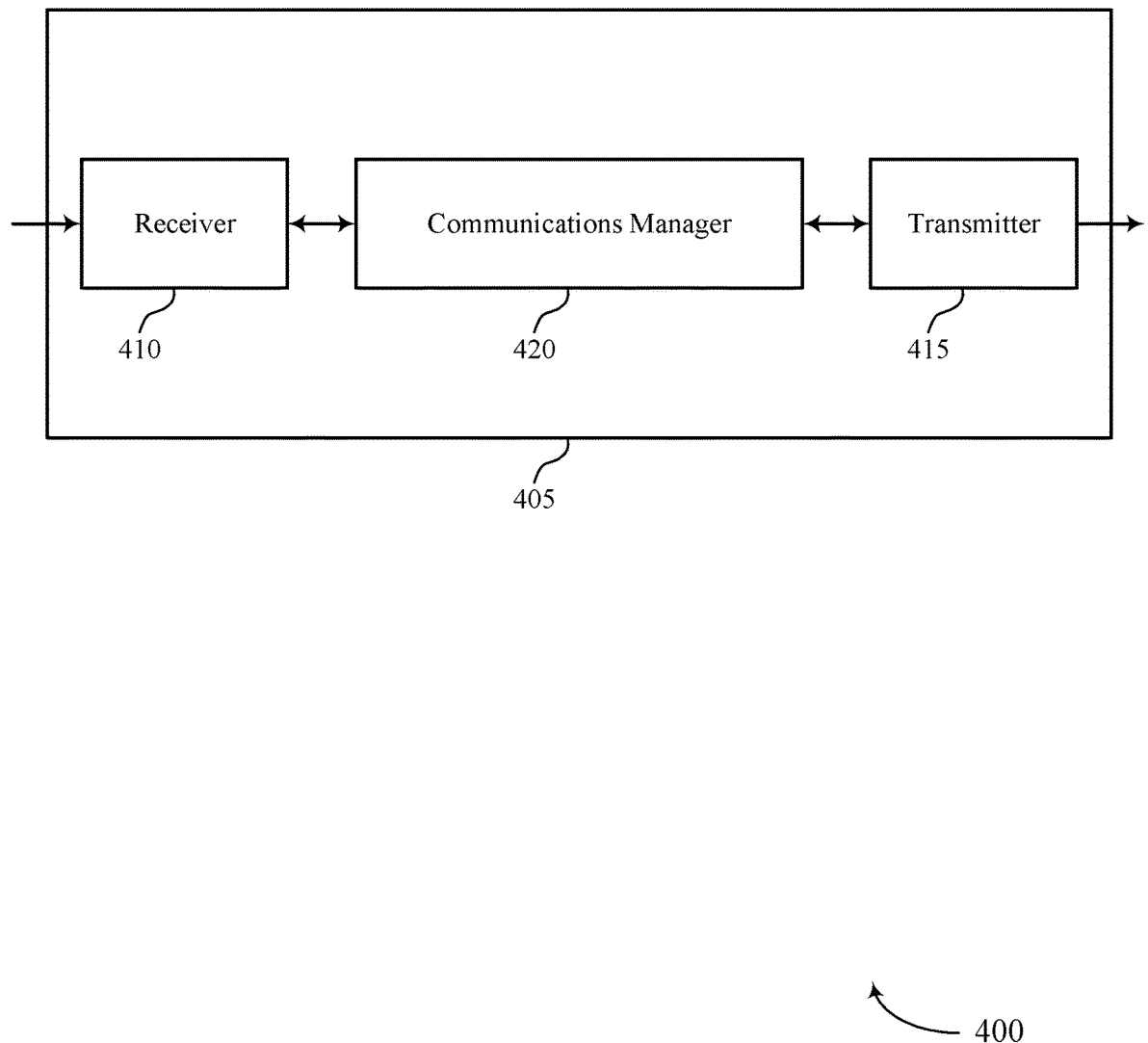
FIGS. 4 and 5 show block diagrams of devices that support the conveying of soft-information to a base station to aid the base station in configuring a duplex configuration in accordance with aspects of the present disclosure.

FIG. 4 shows a block diagram 400 of a device 405 that supports the conveying of soft-information to a base station to aid the base station in configuring a duplex configuration in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to the conveying of soft-information to a base station to aid the base station in configuring a duplex configuration). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to the conveying of soft-information to a base station to aid the base station in configuring a duplex configuration). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of the conveying of soft-information to a base station to aid the base station in configuring a duplex configuration as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for monitoring for one or more downlink transmissions from a base station based on a grant identifying resources for the one or more downlink transmissions. The communications manager 420 may be configured as or otherwise support a means for determining feedback information for each of the one or more downlink transmissions based on the monitoring. The communications manager 420 may be configured as or otherwise support a means for identifying, based on the monitoring, one or more duplexing parameters to be requested to the base station for subsequent communications between the UE and the base station, the one or more duplexing parameters pertaining to operation of the UE in at least one of a full duplex communications mode or a half duplex communications mode. The communications manager 420 may be configured as or otherwise support a means for transmitting a feedback message indicating the feedback information and the one or more duplexing parameters to the base station.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for conveying duplexing parameter(s) in HARQ-ACK feedback to improve full and/or half duplex-based communications.

Figure 5:
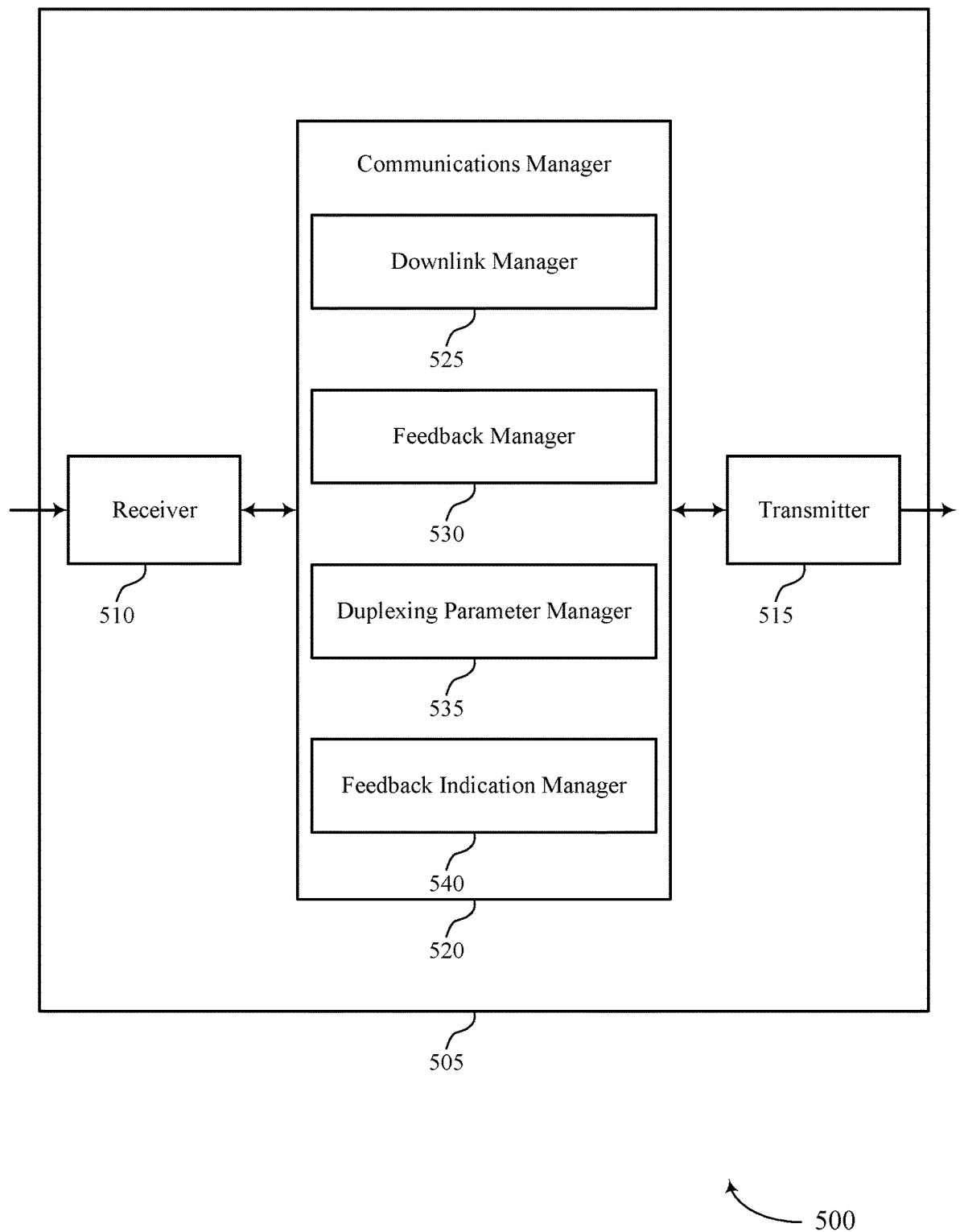

FIG. 5 shows a block diagram 500 of a device 505 that supports the conveying of soft-information to a base station to aid the base station in configuring a duplex configuration in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to the conveying of soft-information to a base station to aid the base station in configuring a duplex configuration). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to the conveying of soft-information to a base station to aid the base station in configuring a duplex configuration). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of the conveying of soft-information to a base station to aid the base station in configuring a duplex configuration as described herein. For example, the communications manager 520 may include a downlink manager 525, a feedback manager 530, a duplexing parameter manager 535, a feedback indication manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The downlink manager 525 may be configured as or otherwise support a means for monitoring for one or more downlink transmissions from a base station based on a grant identifying resources for the one or more downlink transmissions. The feedback manager 530 may be configured as or otherwise support a means for determining feedback information for each of the one or more downlink transmissions based on the monitoring. The duplexing parameter manager 535 may be configured as or otherwise support a means for identifying, based on the monitoring, one or more duplexing parameters to be requested to the base station for subsequent communications between the UE and the base station, the one or more duplexing parameters pertaining to operation of the UE in at least one of a full duplex communications mode or a half duplex communications mode. The feedback indication manager 540 may be configured as or otherwise support a means for transmitting a feedback message indicating the feedback information and the one or more duplexing parameters to the base station.

Figure 6:
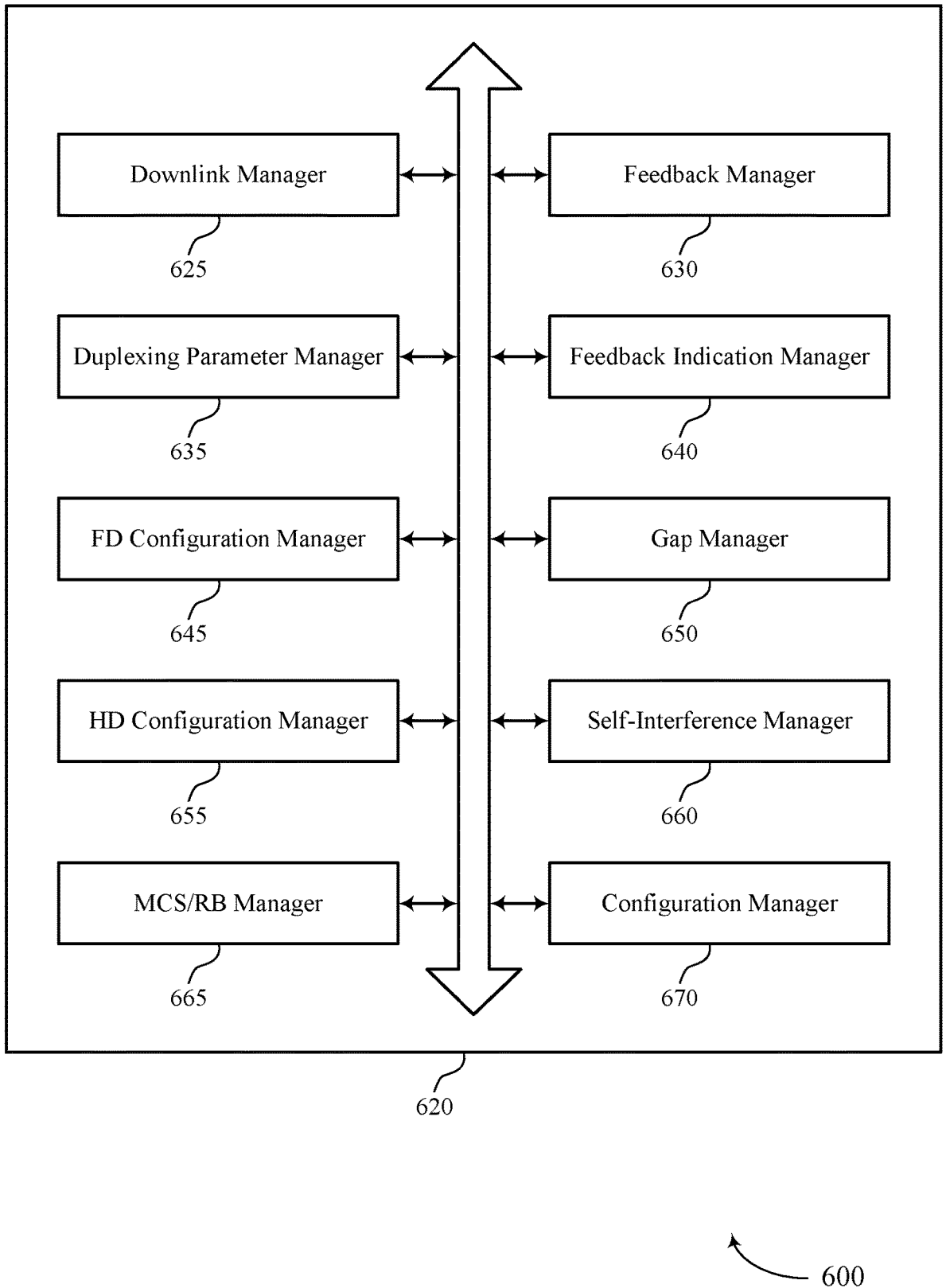
FIG. 6 shows a block diagram of a communications manager that supports the conveying of soft-information to a base station to aid the base station in configuring a duplex configuration in accordance with aspects of the present disclosure.

FIG. 6 shows a block diagram 600 of a communications manager 620 that supports the conveying of soft-information to a base station to aid the base station in configuring a duplex configuration in accordance with aspects of the present disclosure. The communications manager 620 may be an example of aspects of a communications manager 420, a communications manager 520, or both, as described herein. The communications manager 620, or various components thereof, may be an example of means for performing various aspects of the conveying of soft-information to a base station to aid the base station in configuring a duplex configuration as described herein. For example, the communications manager 620 may include a downlink manager 625, a feedback manager 630, a duplexing parameter manager 635, a feedback indication manager 640, an full duplex (FD) configuration manager 645, a gap manager 650, a half duplex (HD) configuration manager 655, a self-interference manager 660, an MCS/RB manager 665, a configuration manager 670, or any combination thereof. Each of these components may communicate, directly or indirectly, with one another (e.g., via one or more buses).

The communications manager 620 may support wireless communication at a UE in accordance with examples as disclosed herein. The downlink manager 625 may be configured as or otherwise support a means for monitoring for one or more downlink transmissions from a base station based on a grant identifying resources for the one or more downlink transmissions. The feedback manager 630 may be configured as or otherwise support a means for determining feedback information for each of the one or more downlink transmissions based on the monitoring. The duplexing parameter manager 635 may be configured as or otherwise support a means for identifying, based on the monitoring, one or more duplexing parameters to be requested to the base station for subsequent communications between the UE and the base station, the one or more duplexing parameters pertaining to operation of the UE in at least one of a full duplex communications mode or a half duplex communications mode. The feedback indication manager 640 may be configured as or otherwise support a means for transmitting a feedback message indicating the feedback information and the one or more duplexing parameters to the base station.

In some examples, to support identifying the one or more duplexing parameters, the FD configuration manager 645 may be configured as or otherwise support a means for identifying, based on the monitoring or the feedback information, a full duplex configuration from a set of full duplex configurations to use for the subsequent communications, where the one or more duplexing parameters include the full duplex configuration. In some examples, the FD configuration manager 645 may be configured as or otherwise support a means for receiving, from the base station, control signaling indicating the set of full duplex configurations.

In some examples, to support identifying the one or more duplexing parameters, the gap manager 650 may be configured as or otherwise support a means for identifying, based on the monitoring or the feedback information, one or more gap periods between a second one or more downlink transmissions and one or more uplink transmissions, where the one or more duplexing parameters include the one or more gap periods.

In some examples, to support identifying the one or more duplexing parameters, the HD configuration manager 655 may be configured as or otherwise support a means for determining, based on the monitoring or the feedback information, that the subsequent communications do not support full duplex communications. In some examples, to support identifying the one or more duplexing parameters, the HD configuration manager 655 may be configured as or otherwise support a means for identifying a half duplexing configuration for the subsequent communications, where the one or more duplexing parameters include the half duplex configuration.

In some examples, to support identifying the one or more duplexing parameters, the self-interference manager 660 may be configured as or otherwise support a means for identifying a self-interference level associated with the UE performing one or more uplink transmissions concurrently with monitoring for the one or more downlink transmissions, where the one or more duplexing parameters include the self-interference level.

In some examples, the MCS/RB manager 665 may be configured as or otherwise support a means for identifying a MCS, a resource block (RB) allocation value, or both, for one or more of a full duplexing configuration, one or more gap periods, a half duplexing configuration, a self-interference value, or a combination thereof, where the feedback message indicates the MCS, the resource block allocation value, or both.

In some examples, to support identifying the one or more duplexing parameters, the configuration manager 670 may be configured as or otherwise support a means for receiving an indication of a set of configurations available for use for the subsequent communications. In some examples, to support identifying the one or more duplexing parameters, the configuration manager 670 may be configured as or otherwise support a means for selecting a configuration from the set of configurations based on the monitoring or the feedback information, where the one or more duplexing parameters include the configuration from the set of configurations.

In some examples, the set of configurations include a first subset of configurations associated with the feedback information including a NACK indication for the one or more downlink transmissions and a second subset of configurations associated with the feedback information including an ACK indication for the one or more downlink transmissions. In some examples, the indication is received in an RRC message, a MAC CE, a DCI message, or a combination thereof. In some examples, each configuration in the set of configurations include a full duplexing configuration, one or more gap periods, a half duplexing configuration, a self-interference value, or a combination thereof. In some examples, the subsequent communications include a retransmission of the one or more downlink transmissions or a second one or more downlink transmissions.

Figure 7:
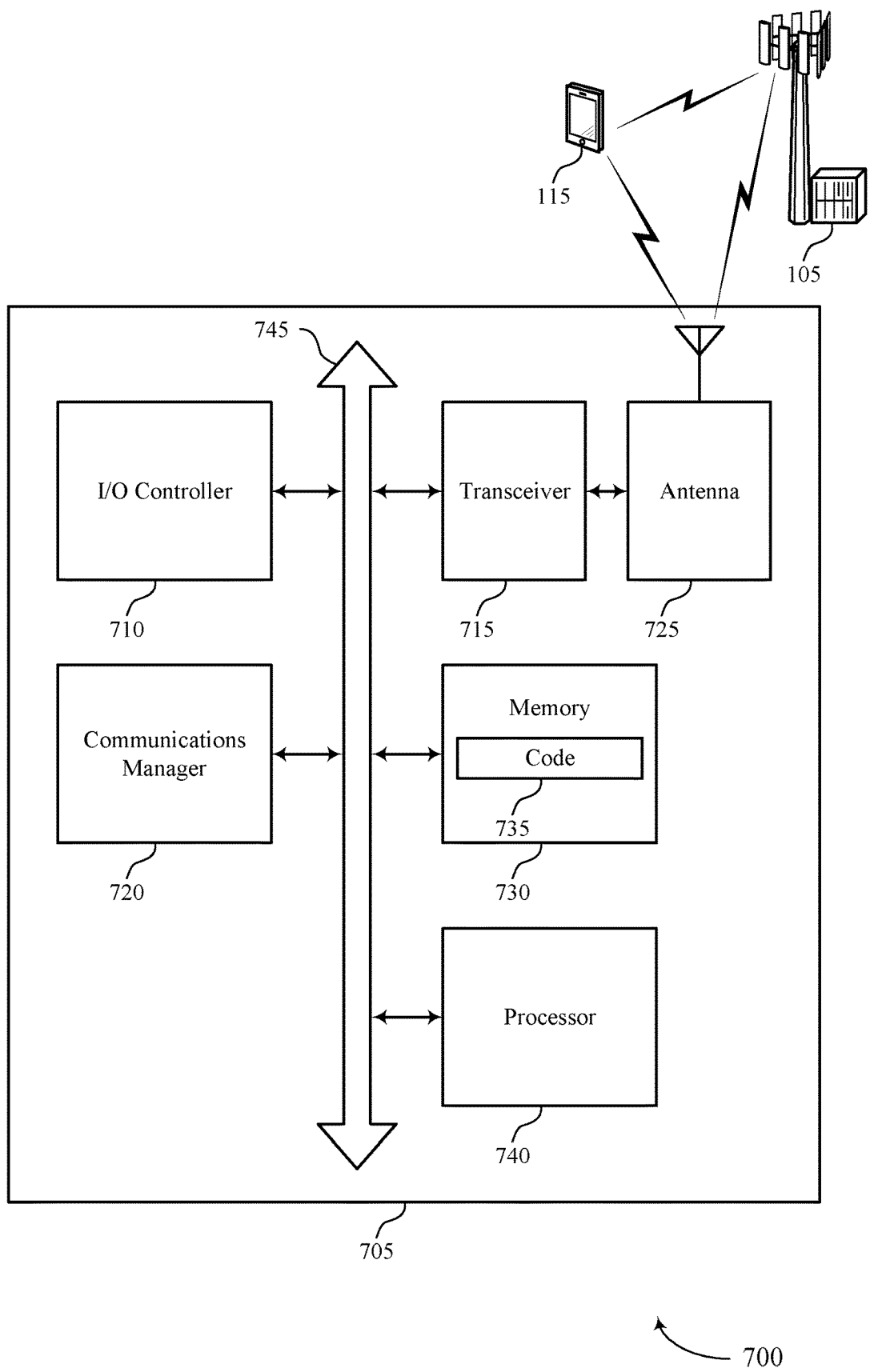
FIG. 7 shows a diagram of a system including a device that supports the conveying of soft-information to a base station to aid the base station in configuring a duplex configuration in accordance with aspects of the present disclosure.

FIG. 7 shows a diagram of a system 700 including a device 705 that supports the conveying of soft-information to a base station to aid the base station in configuring a duplex configuration in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting the conveying of soft-information to a base station to aid the base station in configuring a duplex configuration). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for monitoring for one or more downlink transmissions from a base station based on a grant identifying resources for the one or more downlink transmissions. The communications manager 720 may be configured as or otherwise support a means for determining feedback information for each of the one or more downlink transmissions based on the monitoring. The communications manager 720 may be configured as or otherwise support a means for identifying, based on the monitoring, one or more duplexing parameters to be requested to the base station for subsequent communications between the UE and the base station, the one or more duplexing parameters pertaining to operation of the UE in at least one of a full duplex communications mode or a half duplex communications mode. The communications manager 720 may be configured as or otherwise support a means for transmitting a feedback message indicating the feedback information and the one or more duplexing parameters to the base station.

By including or configuring the communications manager 720 in accordance with examples as described herein, the device 705 may support techniques for conveying duplexing parameter(s) in HARQ-ACK feedback to improve full and/or half duplex-based communications.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of the conveying of soft-information to a base station to aid the base station in configuring a duplex configuration as described herein, or the processor 740 and the memory 730 may be otherwise configured to perform or support such operations.

Figure 8:
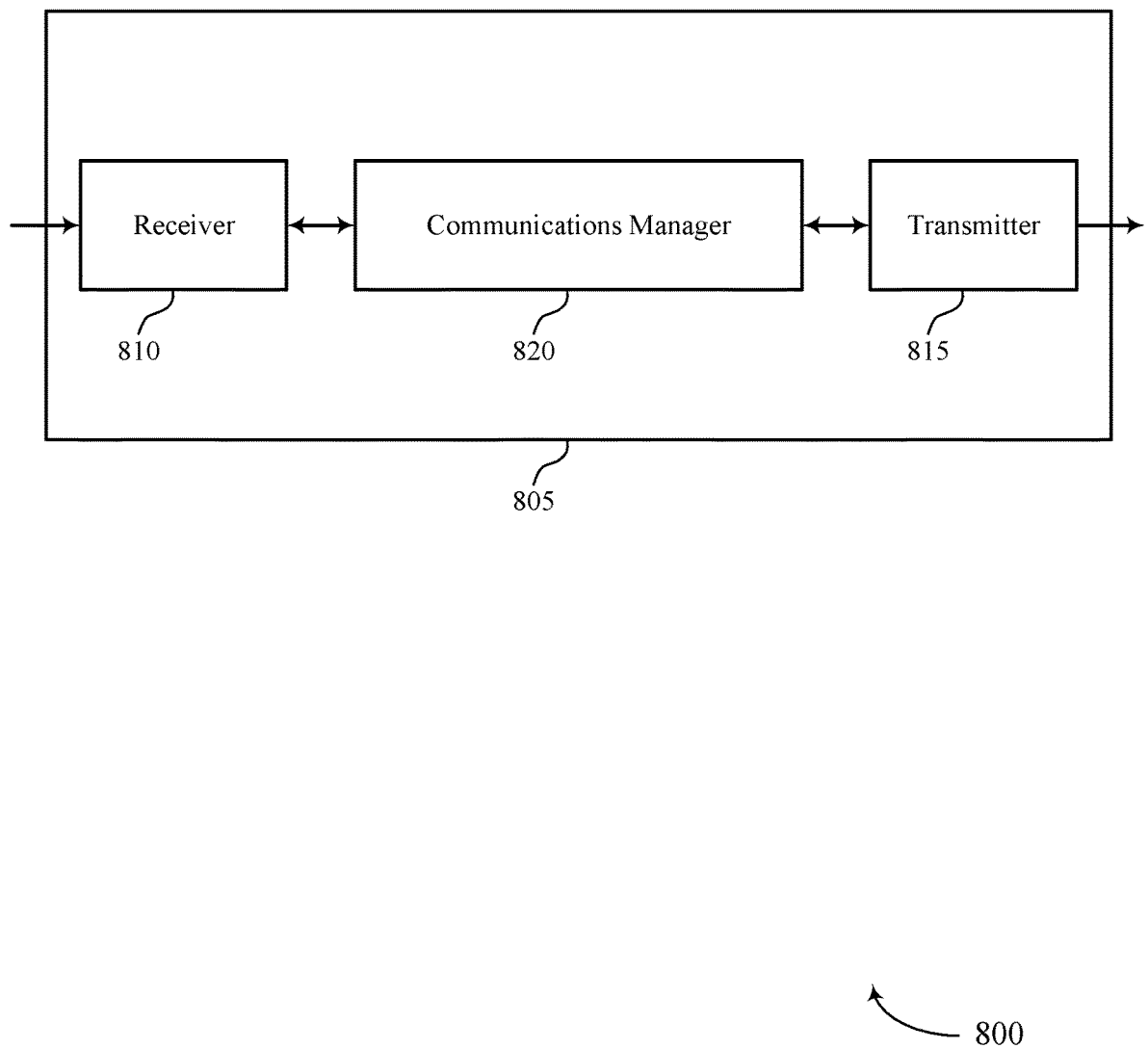
FIGS. 8 and 9 show block diagrams of devices that support the conveying of soft-information to a base station to aid the base station in configuring a duplex configuration in accordance with aspects of the present disclosure.

FIG. 8 shows a block diagram 800 of a device 805 that supports the conveying of soft-information to a base station to aid the base station in configuring a duplex configuration in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to the conveying of soft-information to a base station to aid the base station in configuring a duplex configuration). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to the conveying of soft-information to a base station to aid the base station in configuring a duplex configuration). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of the conveying of soft-information to a base station to aid the base station in configuring a duplex configuration as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, one or more downlink transmissions based on a grant identifying resources for the one or more downlink transmissions. The communications manager 820 may be configured as or otherwise support a means for receiving, from the UE, a feedback message indicating feedback information for each of the one or more downlink transmissions, the feedback message also including one or more duplexing parameters pertaining to operation of the UE in at least one of a full duplex communications mode or a half duplex communications mode. The communications manager 820 may be configured as or otherwise support a means for transmitting subsequent communications to the UE based on the one or more duplexing parameters.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for conveying duplexing parameter(s) in HARQ-ACK feedback to improve full and/or half duplex-based communications.

Figure 9:
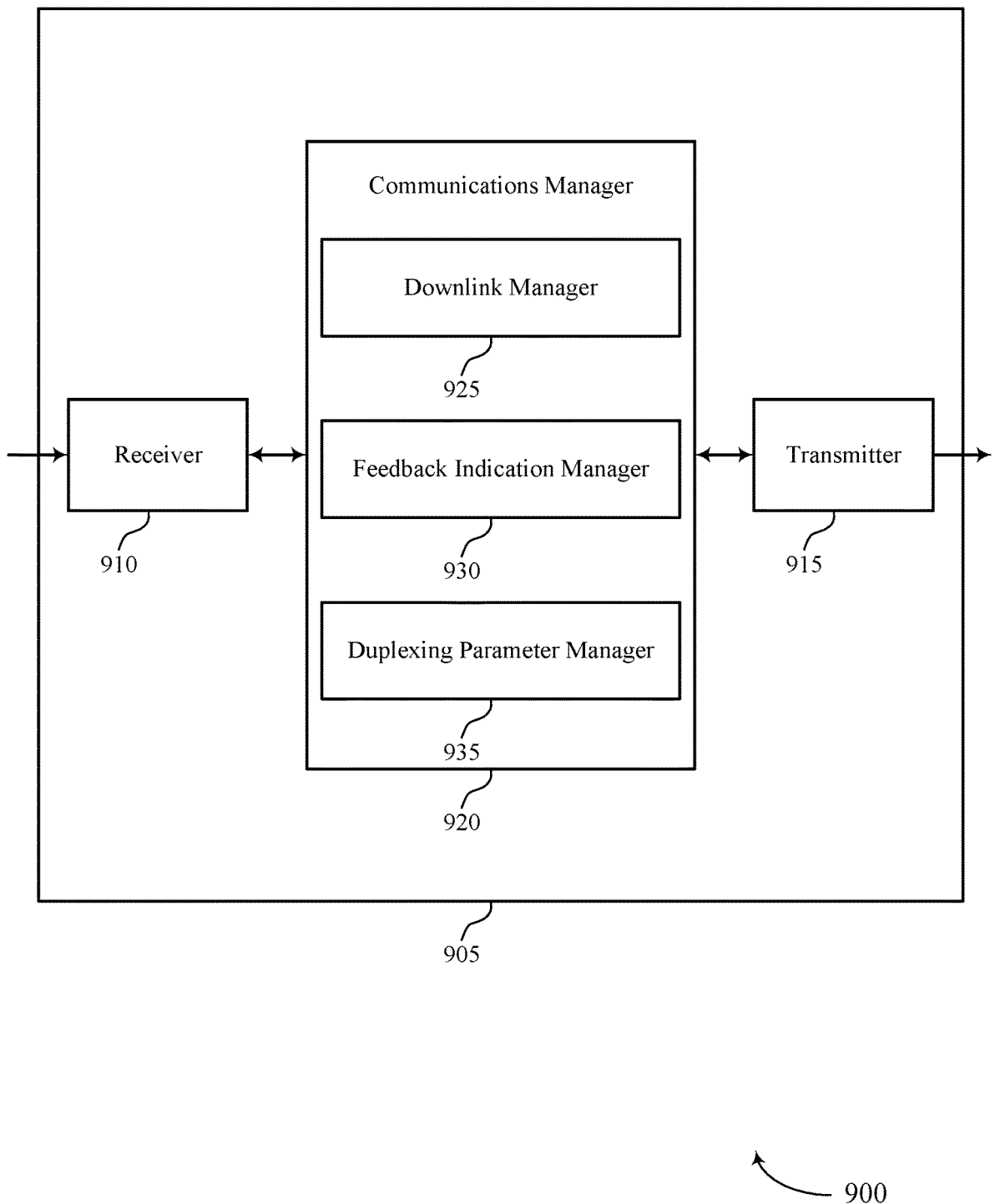

FIG. 9 shows a block diagram 900 of a device 905 that supports the conveying of soft-information to a base station to aid the base station in configuring a duplex configuration in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to the conveying of soft-information to a base station to aid the base station in configuring a duplex configuration). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to the conveying of soft-information to a base station to aid the base station in configuring a duplex configuration). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of the conveying of soft-information to a base station to aid the base station in configuring a duplex configuration as described herein. For example, the communications manager 920 may include a downlink manager 925, a feedback indication manager 930, a duplexing parameter manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The downlink manager 925 may be configured as or otherwise support a means for transmitting, to a UE, one or more downlink transmissions based on a grant identifying resources for the one or more downlink transmissions. The feedback indication manager 930 may be configured as or otherwise support a means for receiving, from the UE, a feedback message indicating feedback information for each of the one or more downlink transmissions, the feedback message also including one or more duplexing parameters pertaining to operation of the UE in at least one of a full duplex communications mode or a half duplex communications mode. The duplexing parameter manager 935 may be configured as or otherwise support a means for transmitting subsequent communications to the UE based on the one or more duplexing parameters.

Figure 10:
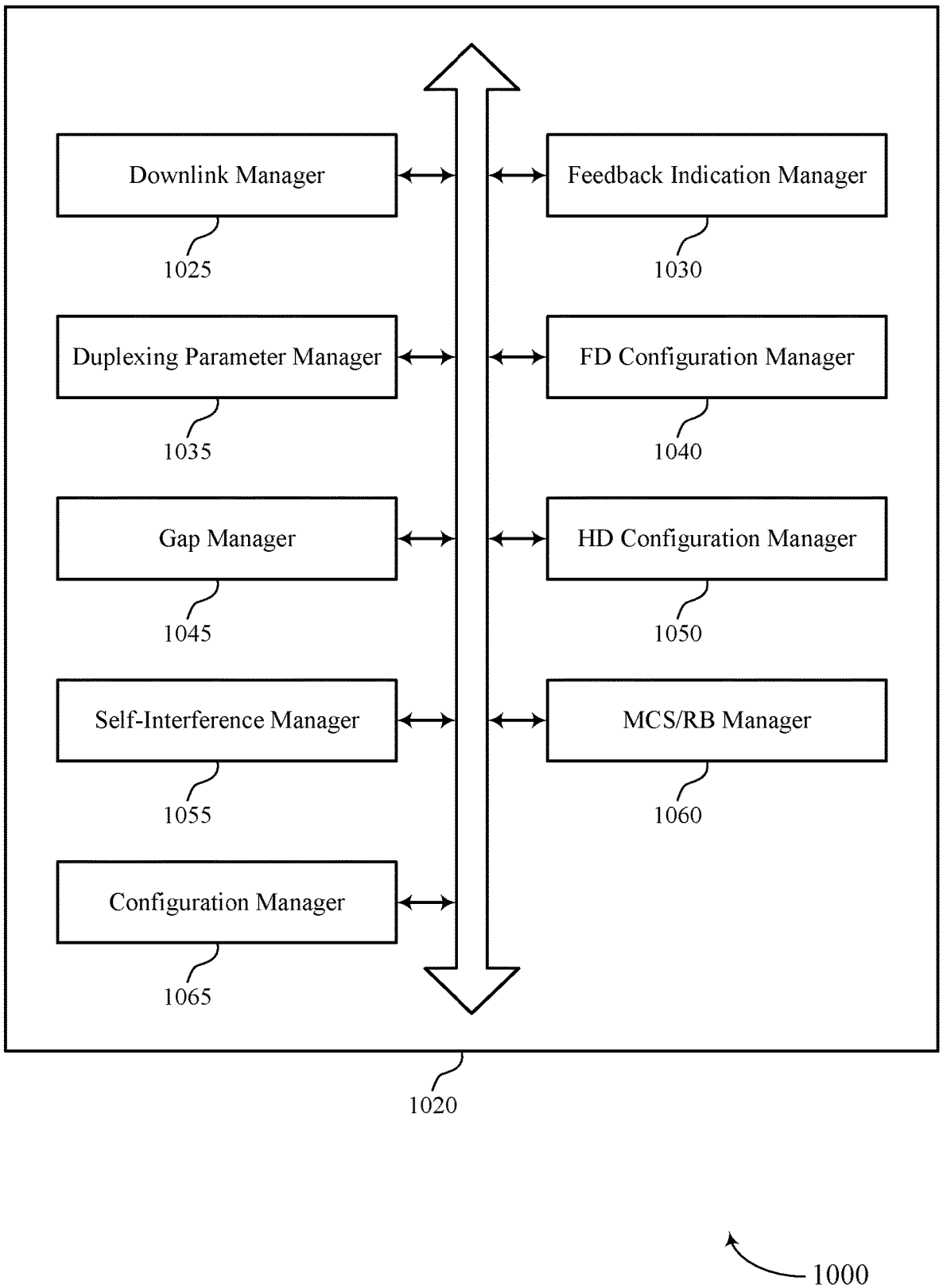
FIG. 10 shows a block diagram of a communications manager that supports the conveying of soft-information to a base station to aid the base station in configuring a duplex configuration in accordance with aspects of the present disclosure.

FIG. 10 shows a block diagram 1000 of a communications manager 1020 that supports the conveying of soft-information to a base station to aid the base station in configuring a duplex configuration in accordance with aspects of the present disclosure. The communications manager 1020 may be an example of aspects of a communications manager 820, a communications manager 920, or both, as described herein. The communications manager 1020, or various components thereof, may be an example of means for performing various aspects of the conveying of soft-information to a base station to aid the base station in configuring a duplex configuration as described herein. For example, the communications manager 1020 may include a downlink manager 1025, a feedback indication manager 1030, a duplexing parameter manager 1035, an FD configuration manager 1040, a gap manager 1045, an HD configuration manager 1050, a self-interference manager 1055, an MCS/RB manager 1060, a configuration manager 1065, or any combination thereof. Each of these components may communicate, directly or indirectly, with one another (e.g., via one or more buses).

The communications manager 1020 may support wireless communication at a base station in accordance with examples as disclosed herein. The downlink manager 1025 may be configured as or otherwise support a means for transmitting, to a UE, one or more downlink transmissions based on a grant identifying resources for the one or more downlink transmissions. The feedback indication manager 1030 may be configured as or otherwise support a means for receiving, from the UE, a feedback message indicating feedback information for each of the one or more downlink transmissions, the feedback message also including one or more duplexing parameters pertaining to operation of the UE in at least one of a full duplex communications mode or a half duplex communications mode. The duplexing parameter manager 1035 may be configured as or otherwise support a means for transmitting subsequent communications to the UE based on the one or more duplexing parameters.

In some examples, the FD configuration manager 1040 may be configured as or otherwise support a means for identifying, based on the feedback message, a full duplex configuration from a set of full duplex configurations to use for the subsequent communications, where the one or more duplexing parameters include the full duplex configuration. In some examples, the FD configuration manager 1040 may be configured as or otherwise support a means for transmitting, to the UE, control signaling indicating the set of full duplex configurations.

In some examples, the gap manager 1045 may be configured as or otherwise support a means for identifying, based on the feedback message, one or more gap periods between a second one or more downlink transmissions and one or more uplink transmissions from the UE, where the one or more duplexing parameters include the one or more gap periods.

In some examples, the HD configuration manager 1050 may be configured as or otherwise support a means for determining, based on the feedback message, that the subsequent communications do not support full duplex communications. In some examples, the HD configuration manager 1050 may be configured as or otherwise support a means for identifying a half duplexing configuration for the subsequent communications.

In some examples, the self-interference manager 1055 may be configured as or otherwise support a means for identifying, based on the feedback message, a self-interference level associated with the UE performing one or more uplink transmissions concurrently with monitoring for the one or more downlink transmissions.

In some examples, the MCS/RB manager 1060 may be configured as or otherwise support a means for identifying, based on the feedback message, a MCS, a RB allocation value, or both, for one or more of full duplexing configurations, one or more gap periods, one or more half duplexing configurations, a self-interference value, or a combination thereof.

In some examples, the configuration manager 1065 may be configured as or otherwise support a means for identifying a set of configurations available for the UE to use for the subsequent communications. In some examples, the configuration manager 1065 may be configured as or otherwise support a means for transmitting an indication of the set of configurations available for use for the subsequent communications, where the feedback message indicates a configuration from the set of configurations.

In some examples, the set of configurations include a first subset of configurations associated with the feedback information including a NACK indication for the one or more downlink transmissions and a second subset of configurations associated with the feedback information including an ACK indication for the one or more downlink transmissions. In some examples, the indication is transmitted in an RRC message, a MAC CE, a DCI message, or a combination thereof. In some examples, each configuration in the set of configurations include a full duplexing configuration, one or more gap periods, a half duplexing configuration, a self-interference value, or a combination thereof. In some examples, the subsequent communications include a retransmission of the one or more downlink transmissions or a second one or more downlink transmissions.

Figure 11:
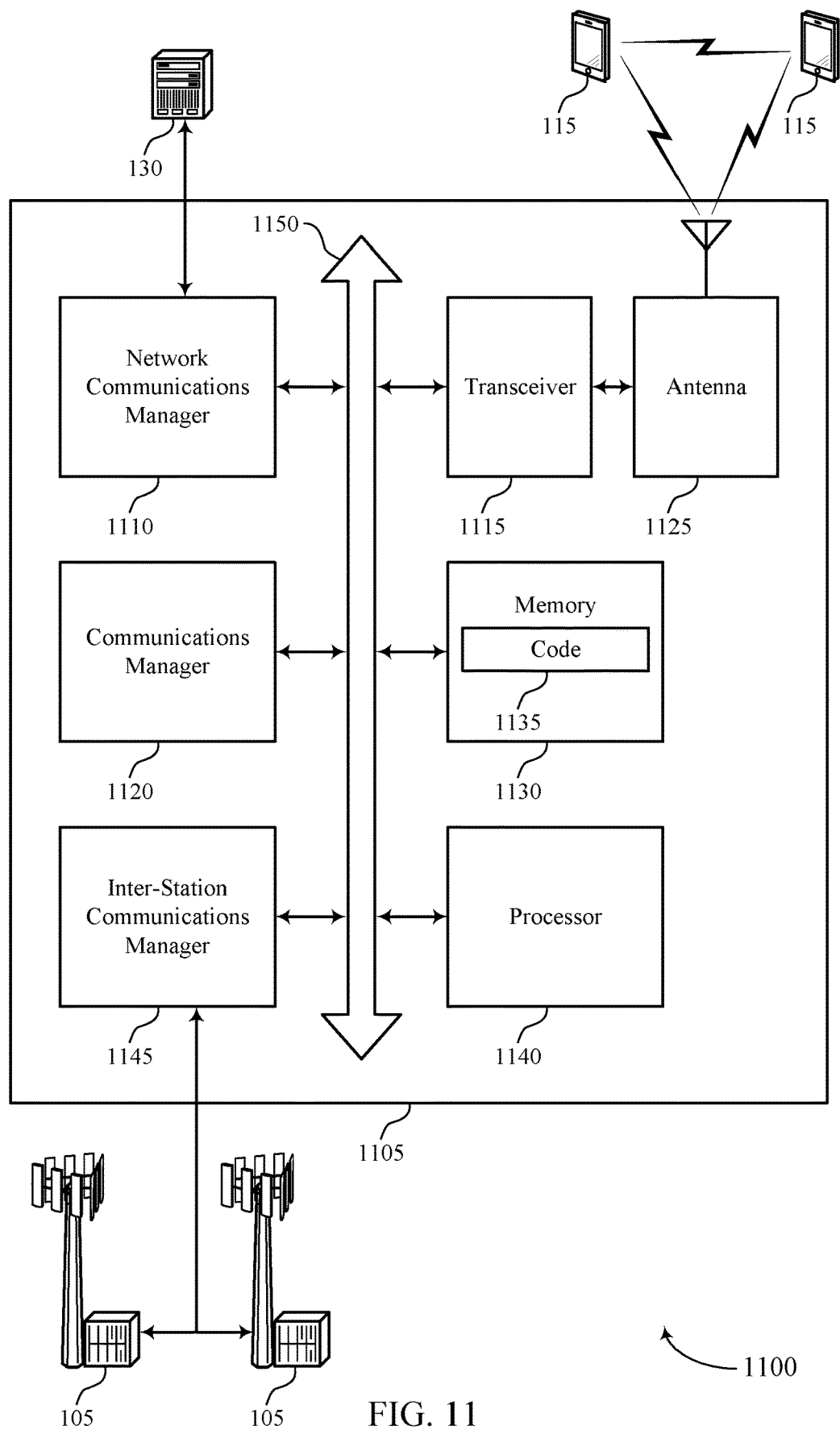
FIG. 11 shows a diagram of a system including a device that supports the conveying of soft-information to a base station to aid the base station in configuring a duplex configuration in accordance with aspects of the present disclosure.

FIG. 11 shows a diagram of a system 1100 including a device 1105 that supports the conveying of soft-information to a base station to aid the base station in configuring a duplex configuration in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting the conveying of soft-information to a base station to aid the base station in configuring a duplex configuration). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, one or more downlink transmissions based on a grant identifying resources for the one or more downlink transmissions. The communications manager 1120 may be configured as or otherwise support a means for receiving, from the UE, a feedback message indicating feedback information for each of the one or more downlink transmissions, the feedback message also including one or more duplexing parameters pertaining to operation of the UE in at least one of a full duplex communications mode or a half duplex communications mode. The communications manager 1120 may be configured as or otherwise support a means for transmitting subsequent communications to the UE based on the one or more duplexing parameters.

By including or configuring the communications manager 1120 in accordance with examples as described herein, the device 1105 may support techniques for conveying duplexing parameter(s) in HARQ-ACK feedback to improve full and/or half duplex-based communications.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of the conveying of soft-information to a base station to aid the base station in configuring a duplex configuration as described herein, or the processor 1140 and the memory 1130 may be otherwise configured to perform or support such operations.

Figure 12:
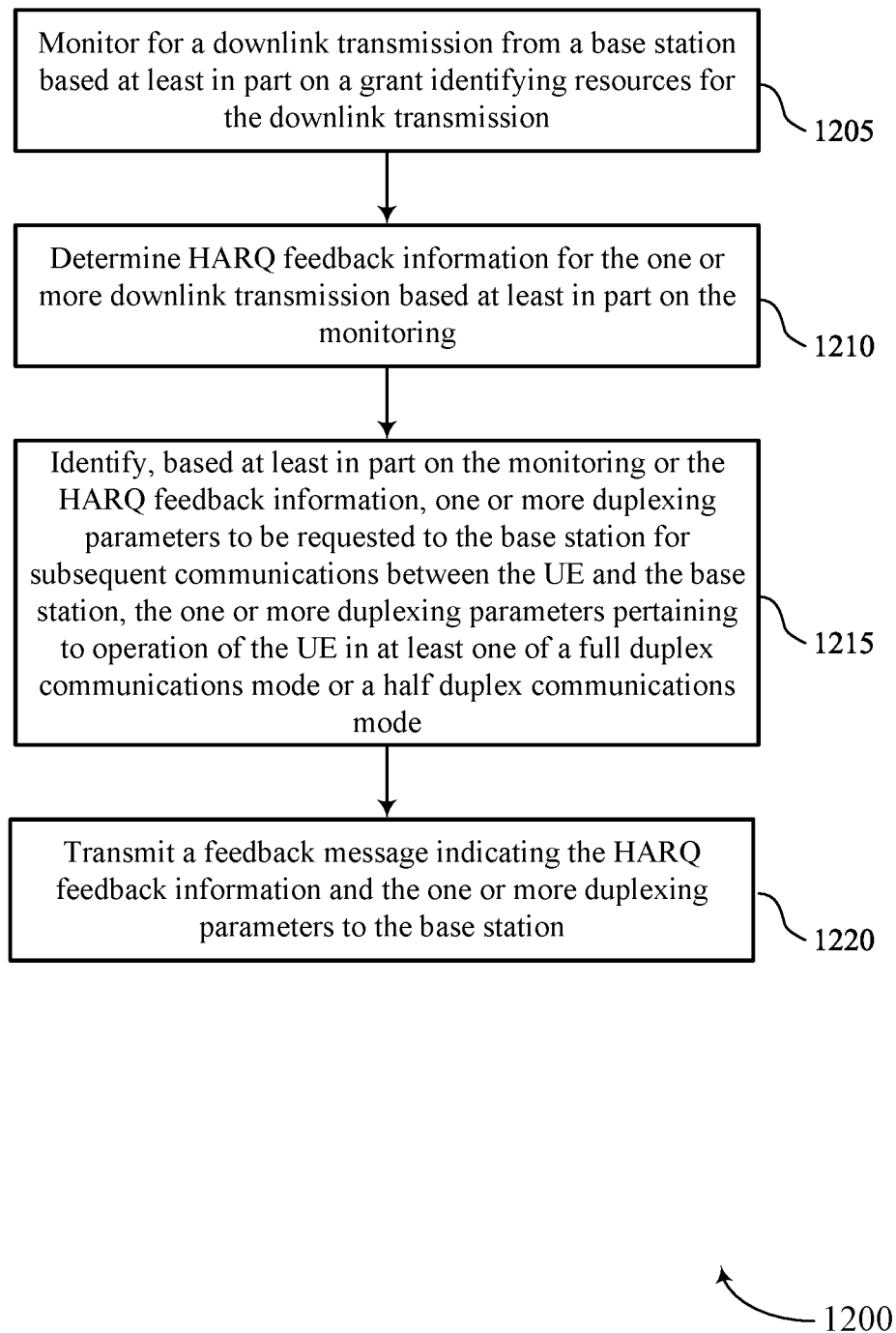
FIGS. 12 through 16 show flowcharts illustrating methods that support the conveying of soft-information to a base station to aid the base station in configuring a duplex configuration in accordance with aspects of the present disclosure.

FIG. 12 shows a flowchart illustrating a method 1200 that supports the conveying of soft-information to a base station to aid the base station in configuring a duplex configuration in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include monitoring for a downlink transmission from a base station based on a grant identifying resources for the downlink transmission. The operations of 1205 may be performed in accordance with examples as disclosed herein. In some examples, aspects of the operations of 1205 may be performed by a downlink manager 625 as described with reference to FIG. 6.

At 1210, the method may include determining HARQ feedback information for the downlink transmission based on the monitoring. The operations of 1210 may be performed in accordance with examples as disclosed herein. In some examples, aspects of the operations of 1210 may be performed by a feedback manager 630 as described with reference to FIG. 6.

At 1215, the method may include identifying, based on the monitoring or the HARQ feedback information, one or more duplexing parameters to be requested to the base station for subsequent communications between the UE and the base station, the one or more duplexing parameters pertaining to operation of the UE in at least one of a full duplex communications mode or a half duplex communications mode. The operations of 1215 may be performed in accordance with examples as disclosed herein. In some examples, aspects of the operations of 1215 may be performed by a duplexing parameter manager 635 as described with reference to FIG. 6.

At 1220, the method may include transmitting a feedback message indicating the HARQ feedback information and the one or more duplexing parameters to the base station. The operations of 1220 may be performed in accordance with examples as disclosed herein. In some examples, aspects of the operations of 1220 may be performed by a feedback indication manager 640 as described with reference to FIG. 6.

Figure 13:
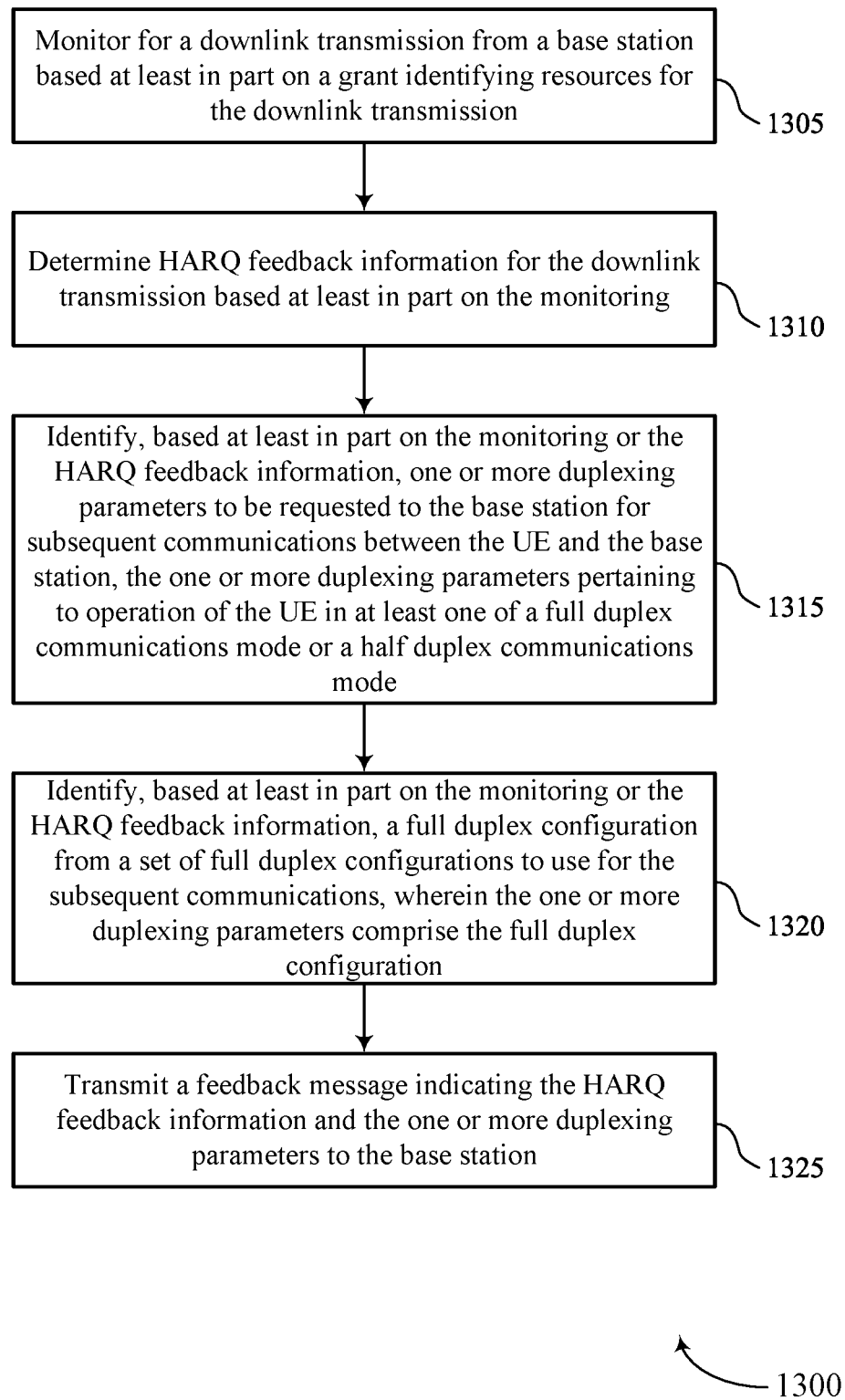

FIG. 13 shows a flowchart illustrating a method 1300 that supports the conveying of soft-information to a base station to aid the base station in configuring a duplex configuration in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include monitoring for a downlink transmission from a base station based on a grant identifying resources for the downlink transmission. The operations of 1305 may be performed in accordance with examples as disclosed herein. In some examples, aspects of the operations of 1305 may be performed by a downlink manager 625 as described with reference to FIG. 6.

At 1310, the method may include determining HARQ feedback information for the downlink transmission based on the monitoring. The operations of 1310 may be performed in accordance with examples as disclosed herein. In some examples, aspects of the operations of 1310 may be performed by a feedback manager 630 as described with reference to FIG. 6.

At 1315, the method may include identifying, based on the monitoring or the HARQ feedback information, one or more duplexing parameters to be requested to the base station for subsequent communications between the UE and the base station, the one or more duplexing parameters pertaining to operation of the UE in at least one of a full duplex communications mode or a half duplex communications mode. The operations of 1315 may be performed in accordance with examples as disclosed herein. In some examples, aspects of the operations of 1315 may be performed by a duplexing parameter manager 635 as described with reference to FIG. 6.

At 1320, the method may include identifying, based on the monitoring or the HARQ feedback information, a full duplex configuration from a set of full duplex configurations to use for the subsequent communications, where the one or more duplexing parameters include the full duplex configuration. The operations of 1320 may be performed in accordance with examples as disclosed herein. In some examples, aspects of the operations of 1320 may be performed by an FD configuration manager 645 as described with reference to FIG. 6.

At 1325, the method may include transmitting a feedback message indicating the HARQ feedback information and the one or more duplexing parameters to the base station. The operations of 1325 may be performed in accordance with examples as disclosed herein. In some examples, aspects of the operations of 1325 may be performed by a feedback indication manager 640 as described with reference to FIG. 6.

Figure 14:
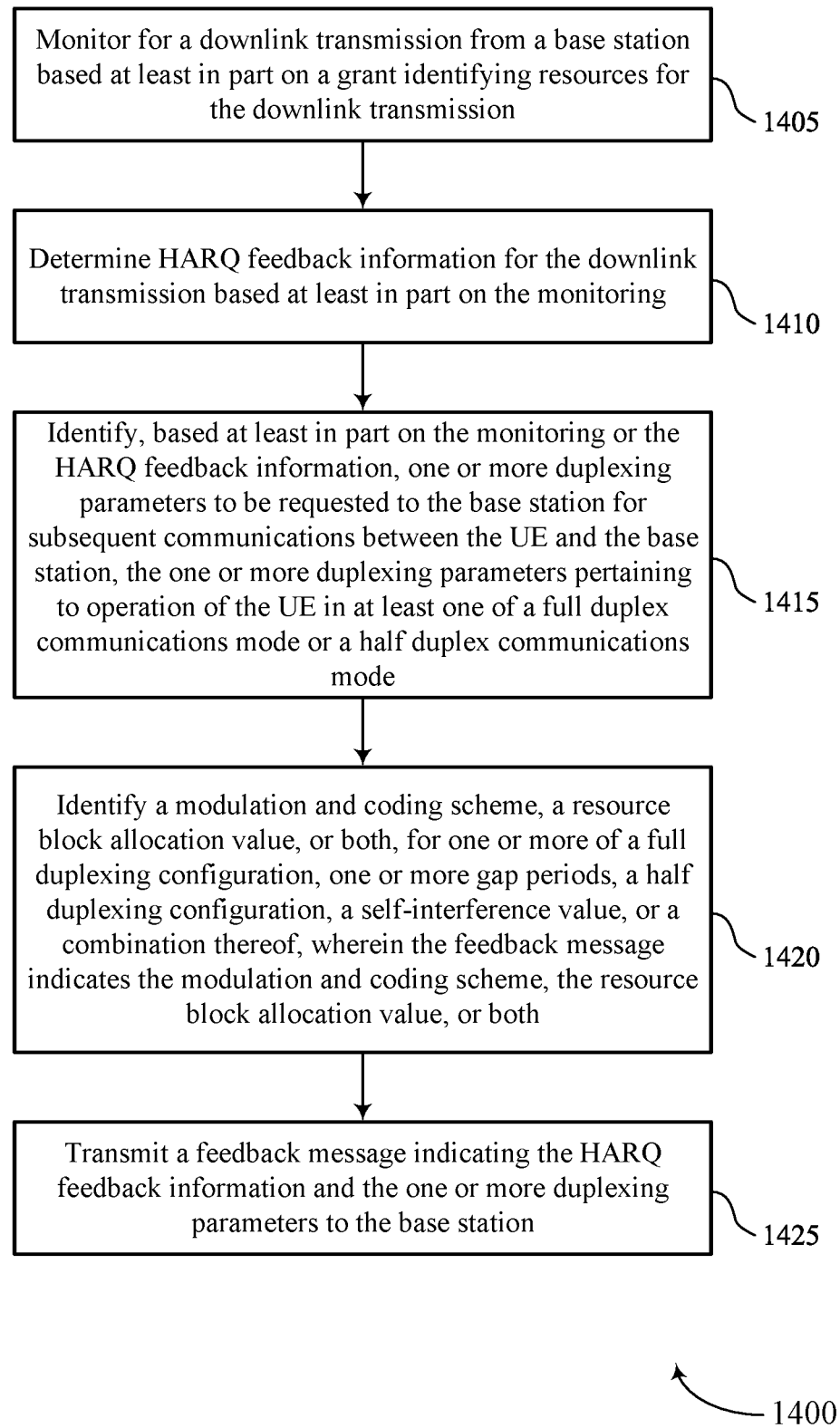

FIG. 14 shows a flowchart illustrating a method 1400 that supports the conveying of soft-information to a base station to aid the base station in configuring a duplex configuration in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include monitoring for a downlink transmission from a base station based on a grant identifying resources for the downlink transmission. The operations of 1405 may be performed in accordance with examples as disclosed herein. In some examples, aspects of the operations of 1405 may be performed by a downlink manager 625 as described with reference to FIG. 6.

At 1410, the method may include determining HARQ feedback information for the downlink transmission based on the monitoring. The operations of 1410 may be performed in accordance with examples as disclosed herein. In some examples, aspects of the operations of 1410 may be performed by a feedback manager 630 as described with reference to FIG. 6.

At 1415, the method may include identifying, based on the monitoring or the HARQ feedback information, one or more duplexing parameters to be requested to the base station for subsequent communications between the UE and the base station, the one or more duplexing parameters pertaining to operation of the UE in at least one of a full duplex communications mode or a half duplex communications mode. The operations of 1415 may be performed in accordance with examples as disclosed herein. In some examples, aspects of the operations of 1415 may be performed by a duplexing parameter manager 635 as described with reference to FIG. 6.

At 1420, the method may include identifying a modulation and coding scheme, a resource block allocation value, or both, for one or more of a full duplexing configuration, one or more gap periods, a half duplexing configuration, a self-interference value, or a combination thereof, where the feedback message indicates the modulation and coding scheme, the resource block allocation value, or both. The operations of 1420 may be performed in accordance with examples as disclosed herein. In some examples, aspects of the operations of 1420 may be performed by an MCS/RB manager 665 as described with reference to FIG. 6.

At 1425, the method may include transmitting a feedback message indicating the HARQ feedback information and the one or more duplexing parameters to the base station. The operations of 1425 may be performed in accordance with examples as disclosed herein. In some examples, aspects of the operations of 1425 may be performed by a feedback indication manager 640 as described with reference to FIG. 6.

Figure 15:
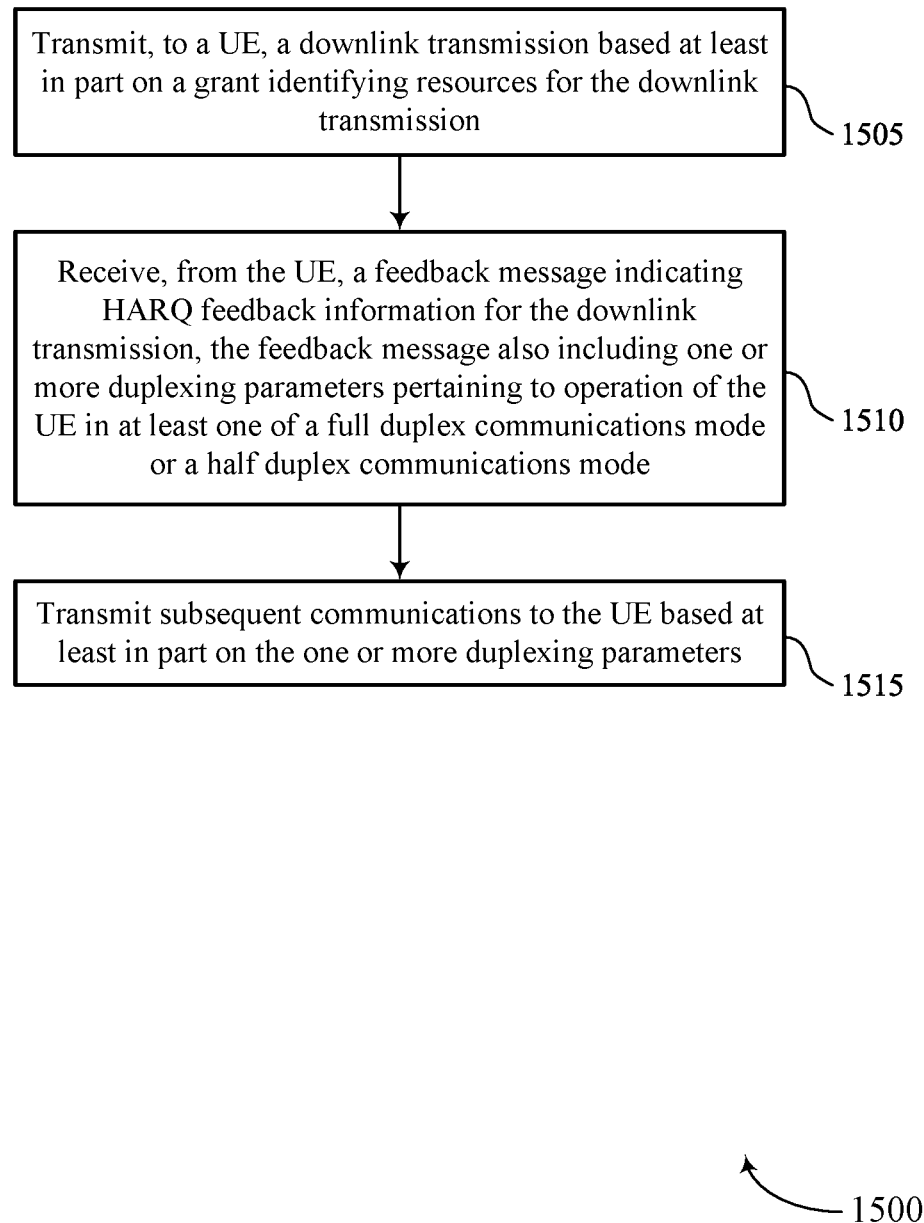

FIG. 15 shows a flowchart illustrating a method 1500 that supports the conveying of soft-information to a base station to aid the base station in configuring a duplex configuration in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1505, the method may include transmitting, to a UE, a downlink transmission based on a grant identifying resources for the downlink transmission. The operations of 1505 may be performed in accordance with examples as disclosed herein. In some examples, aspects of the operations of 1505 may be performed by a downlink manager 1025 as described with reference to FIG. 10.

At 1510, the method may include receiving, from the UE, a feedback message indicating HARQ feedback information for the downlink transmission, the feedback message also including one or more duplexing parameters pertaining to operation of the UE in at least one of a full duplex communications mode or a half duplex communications mode. The operations of 1510 may be performed in accordance with examples as disclosed herein. In some examples, aspects of the operations of 1510 may be performed by a feedback indication manager 1030 as described with reference to FIG. 10.

At 1515, the method may include transmitting subsequent communications to the UE based on the one or more duplexing parameters. The operations of 1515 may be performed in accordance with examples as disclosed herein. In some examples, aspects of the operations of 1515 may be performed by a duplexing parameter manager 1035 as described with reference to FIG. 10.

Figure 16:
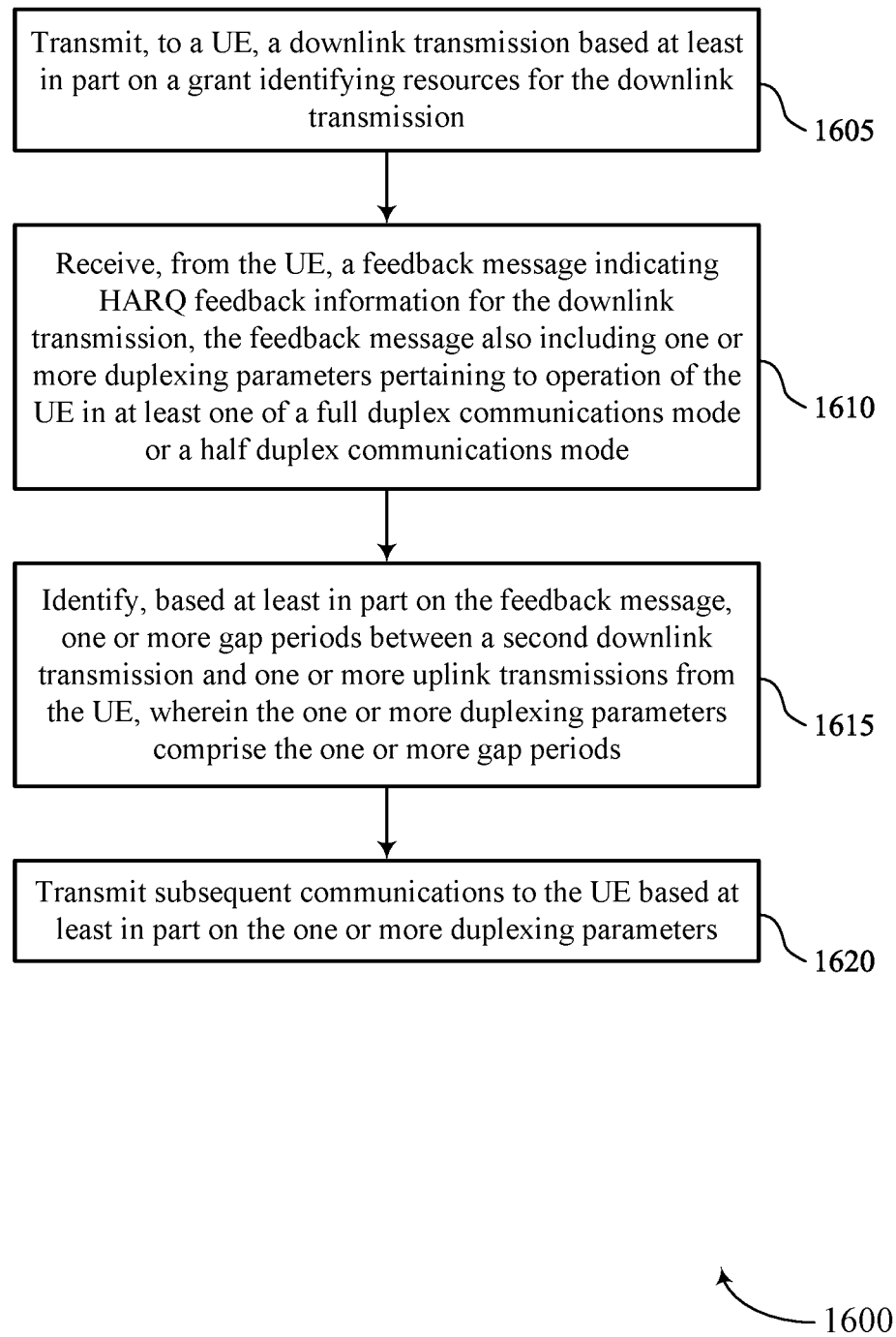

FIG. 16 shows a flowchart illustrating a method 1600 that supports the conveying of soft-information to a base station to aid the base station in configuring a duplex configuration in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1605, the method may include transmitting, to a UE, a downlink transmission based on a grant identifying resources for the downlink transmission. The operations of 1605 may be performed in accordance with examples as disclosed herein. In some examples, aspects of the operations of 1605 may be performed by a downlink manager 1025 as described with reference to FIG. 10.

At 1610, the method may include receiving, from the UE, a feedback message indicating HARQ feedback information for the downlink transmission, the feedback message also including one or more duplexing parameters pertaining to operation of the UE in at least one of a full duplex communications mode or a half duplex communications mode. The operations of 1610 may be performed in accordance with examples as disclosed herein. In some examples, aspects of the operations of 1610 may be performed by a feedback indication manager 1030 as described with reference to FIG. 10.

At 1615, the method may include identifying, based on the feedback message, one or more gap periods between a second downlink transmission and one or more uplink transmissions from the UE, where the one or more duplexing parameters include the one or more gap periods. The operations of 1615 may be performed in accordance with examples as disclosed herein. In some examples, aspects of the operations of 1615 may be performed by a gap manager 1045 as described with reference to FIG. 10.

At 1620, the method may include transmitting subsequent communications to the UE based on the one or more duplexing parameters. The operations of 1620 may be performed in accordance with examples as disclosed herein. In some examples, aspects of the operations of 1620 may be performed by a duplexing parameter manager 1035 as described with reference to FIG. 10.

The following provides an overview of aspects of the present disclosure:

Aspect 1: A method for wireless communication at a UE, comprising: monitoring for one or more downlink transmissions from a base station based at least in part on a grant identifying resources for the one or more downlink transmissions; determining HARQ feedback information for each of the one or more downlink transmissions based at least in part on the monitoring; identifying, based at least in part on the monitoring or the HARQ feedback information, one or more duplexing parameters to be requested to the base station for subsequent communications between the UE and the base station, the one or more duplexing parameters pertaining to operation of the UE in at least one of a full duplex communications mode or a half duplex communications mode; and transmitting a feedback message indicating the HARQ feedback information and the one or more duplexing parameters to the base station.

Aspect 2: The method of aspect 1, wherein identifying the one or more duplexing parameters further comprises: identifying, based at least in part on the monitoring or the feedback information, a full duplex configuration from a set of full duplex configurations to use for the subsequent communications, wherein the one or more duplexing parameters comprise the full duplex configuration.

Aspect 3: The method of aspect 2, further comprising: receiving, from the base station, control signaling indicating the set of full duplex configurations.

Aspect 4: The method of any of aspects 1 through 3, wherein identifying the one or more duplexing parameters further comprises: identifying, based at least in part on the monitoring or the feedback information, one or more gap periods between a second one or more downlink transmissions and one or more uplink transmissions, wherein the one or more duplexing parameters comprise the one or more gap periods.

Aspect 5: The method of any of aspects 1 through 4, wherein identifying the one or more duplexing parameters further comprises: determining, based at least in part on the monitoring or the feedback information, that the subsequent communications do not support full duplex communications; and identifying a half duplexing configuration for the subsequent communications, wherein the one or more duplexing parameters comprise the half duplex configuration.

Aspect 6: The method of any of aspects 1 through 5, wherein identifying the one or more duplexing parameters further comprises: identifying a self-interference level associated with the UE performing one or more uplink transmissions concurrently with monitoring for the one or more downlink transmissions, wherein the one or more duplexing parameters comprise the self-interference level.

Aspect 7: The method of any of aspects 1 through 6, further comprising: identifying a MCS, a resource block allocation value, or both, for one or more of a full duplexing configuration, one or more gap periods, a half duplexing configuration, a self-interference value, or a combination thereof, wherein the feedback message indicates the MCS, the resource block allocation value, or both.

Aspect 8: The method of any of aspects 1 through 7, wherein identifying the one or more duplexing parameters further comprises: receiving an indication of a set of configurations available for use for the subsequent communications; and selecting a configuration from the set of configurations based at least in part on the monitoring or the feedback information, wherein the one or more duplexing parameters comprise the configuration from the set of configurations.

Aspect 9: The method of aspect 8, wherein the set of configurations comprise a first subset of configurations associated with the feedback information comprising a NACK indication for the one or more downlink transmissions and a second subset of configurations associated with the feedback information comprising an ACK indication for the one or more downlink transmissions.

Aspect 10: The method of any of aspects 8 through 9, wherein the indication is received in an RRC message, a MAC CE, a DCI message, or a combination thereof.

Aspect 11: The method of any of aspects 8 through 10, wherein each configuration in the set of configurations comprise a full duplexing configuration, one or more gap periods, a half duplexing configuration, a self-interference value, or a combination thereof.

Aspect 12: The method of any of aspects 1 through 11, wherein the subsequent communications comprise a retransmission of the one or more downlink transmissions or a second one or more downlink transmissions.

Aspect 13: A method for wireless communication at a base station, comprising: transmitting, to a UE, one or more downlink transmissions based at least in part on a grant identifying resources for the one or more downlink transmissions; receiving, from the UE, a feedback message indicating HARQ feedback information for each of the one or more downlink transmissions, the feedback message also including one or more duplexing parameters pertaining to operation of the UE in at least one of a full duplex communications mode or a half duplex communications mode; and transmitting subsequent communications to the UE based at least in part on the one or more duplexing parameters.

Aspect 14: The method of aspect 13, further comprising: identifying, based at least in part on the feedback message, a full duplex configuration from a set of full duplex configurations to use for the subsequent communications, wherein the one or more duplexing parameters comprise the full duplex configuration.

Aspect 15: The method of aspect 14, further comprising: transmitting, to the UE, control signaling indicating the set of full duplex configurations.

Aspect 16: The method of any of aspects 13 through 15, further comprising: identifying, based at least in part on the feedback message, one or more gap periods between a second one or more downlink transmissions and one or more uplink transmissions from the UE, wherein the one or more duplexing parameters comprise the one or more gap periods.

Aspect 17: The method of any of aspects 13 through 16, further comprising: determining, based at least in part on the feedback message, that the subsequent communications do not support full duplex communications; and identifying a half duplexing configuration for the subsequent communications.

Aspect 18: The method of any of aspects 13 through 17, further comprising: identifying, based at least in part on the feedback message, a self-interference level associated with the UE performing one or more uplink transmissions concurrently with monitoring for the one or more downlink transmissions.

Aspect 19: The method of any of aspects 13 through 18, further comprising: identifying, based at least in part on the feedback message, a MCS, a resource block allocation value, or both, for one or more of full duplexing configurations, one or more gap periods, one or more half duplexing configurations, a self-interference value, or a combination thereof.

Aspect 20: The method of any of aspects 13 through 19, further comprising: identifying a set of configurations available for the UE to use for the subsequent communications; and transmitting an indication of the set of configurations available for use for the subsequent communications, wherein the feedback message indicates a configuration from the set of configurations.

Aspect 21: The method of aspect 20, wherein the set of configurations comprise a first subset of configurations associated with the feedback information comprising a NACK indication for the one or more downlink transmissions and a second subset of configurations associated with the feedback information comprising an ACK indication for the one or more downlink transmissions.

Aspect 22: The method of any of aspects 20 through 21, wherein the indication is transmitted in an RRC message, a MAC CE, a DCI message, or a combination thereof.

Aspect 23: The method of any of aspects 20 through 22, wherein each configuration in the set of configurations comprise a full duplexing configuration, one or more gap periods, a half duplexing configuration, a self-interference value, or a combination thereof.

Aspect 24: The method of any of aspects 13 through 23, wherein the subsequent communications comprise a retransmission of the one or more downlink transmissions or a second one or more downlink transmissions.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   monitoring for a downlink transmission from a network device based at least in part on a grant identifying resources for the downlink transmission;
   determining hybrid automatic repeat request (HARQ) feedback information for the downlink transmission based at least in part on the monitoring, wherein the HARQ feedback information comprises either an acknowledgement indication or a negative-acknowledgement indication associated with the downlink transmission;
   identifying, based at least in part on the monitoring or the HARQ feedback information, one or more duplexing parameters to be requested to the network device for subsequent communications between the UE and the network device, the one or more duplexing parameters pertaining to operation of the UE in at least one of a full duplex communications mode or a half duplex communications mode; and
   transmitting a feedback message indicating the HARQ feedback information and the one or more duplexing parameters to the network device.

2. The method of claim 1, wherein identifying the one or more duplexing parameters further comprises:
   identifying, based at least in part on the monitoring or the HARQ feedback information, a full duplex configuration from a set of full duplex configurations to use for the subsequent communications, wherein the one or more duplexing parameters comprise the full duplex configuration.

3. The method of claim 2, further comprising:
   receiving, from the network device, control signaling indicating the set of full duplex configurations.

4. The method of claim 1, wherein identifying the one or more duplexing parameters further comprises:
   identifying, based at least in part on the monitoring or the HARQ feedback information, one or more gap periods between a second downlink transmission and one or more uplink transmissions, wherein the one or more duplexing parameters comprise the one or more gap periods.

5. The method of claim 1, wherein identifying the one or more duplexing parameters further comprises:
   determining, based at least in part on the monitoring or the HARQ feedback information, that the subsequent communications do not support full duplex communications; and
   identifying a half duplexing configuration for the subsequent communications, wherein the one or more duplexing parameters comprise the half duplexing configuration.

6. The method of claim 1, wherein identifying the one or more duplexing parameters further comprises:
   identifying a self-interference level associated with the UE performing one or more uplink transmissions concurrently with monitoring for the downlink transmission, wherein the one or more duplexing parameters comprise the self-interference level.

7. The method of claim 1, further comprising:
   identifying a modulation and coding scheme, a resource block allocation value, or both, for one or more of a full duplexing configuration, one or more gap periods, a half duplexing configuration, a self-interference value, or a combination thereof, wherein the feedback message indicates the modulation and coding scheme, the resource block allocation value, or both.

8. The method of claim 1, wherein identifying the one or more duplexing parameters further comprises:
   receiving an indication of a set of configurations available for use for the subsequent communications; and
   selecting a configuration from the set of configurations based at least in part on the monitoring or the HARQ feedback information, wherein the one or more duplexing parameters comprise the configuration from the set of configurations.

9. The method of claim 8, wherein the set of configurations comprise a first subset of configurations associated with the HARQ feedback information comprising the negative-acknowledgement indication for the downlink transmission and a second subset of configurations associated with the HARQ feedback information comprising the acknowledgement indication for the downlink transmission.

10. The method of claim 8, wherein the indication is received in a radio resource control (RRC) message, a medium access control (MAC) control element (CE), a downlink control information (DCI) message, or a combination thereof.

11. The method of claim 8, wherein each configuration in the set of configurations comprise a full duplexing configuration, one or more gap periods, a half duplexing configuration, a self-interference value, or a combination thereof.

12. The method of claim 1, wherein the subsequent communications comprise a retransmission of the downlink transmission or a second set of downlink transmission.

13. The method of claim 1, wherein the feedback message comprises the HARQ feedback information, the one or more duplexing parameters, and a delta modulation and coding scheme value.

14. The method of claim 1, wherein transmitting the feedback message further comprises:
transmitting the HARQ feedback information and the one or more duplexing parameters on a physical uplink control channel.

15. A method for wireless communication at a network device, comprising:
transmitting, to a user equipment (UE), a downlink transmission based at least in part on a grant identifying resources for the downlink transmission;
receiving, from the UE, a feedback message indicating hybrid automatic repeat request (HARQ) feedback information for the downlink transmission, the feedback message also including one or more duplexing parameters pertaining to operation of the UE in at least one of a full duplex communications mode or a half duplex communications mode, wherein the HARQ feedback information comprises either an acknowledgement indication or a negative-acknowledgement indication associated with the downlink transmission; and
transmitting subsequent communications to the UE based at least in part on the one or more duplexing parameters.

16. The method of claim 15, further comprising:
identifying, based at least in part on the feedback message, a full duplex configuration from a set of full duplex configurations to use for the subsequent communications, wherein the one or more duplexing parameters comprise the full duplex configuration.

17. The method of claim 16, further comprising:
transmitting, to the UE, control signaling indicating the set of full duplex configurations.

18. The method of claim 15, further comprising:
identifying, based at least in part on the feedback message, one or more gap periods between a second downlink transmission and one or more uplink transmissions from the UE, wherein the one or more duplexing parameters comprise the one or more gap periods.

19. The method of claim 15, further comprising:
determining, based at least in part on the feedback message, that the subsequent communications do not support full duplex communications; and
identifying a half duplexing configuration for the subsequent communications.

20. The method of claim 15, further comprising:
identifying, based at least in part on the feedback message, a self-interference level associated with the UE performing one or more uplink transmissions concurrently with monitoring for the downlink transmission.

21. The method of claim 15, further comprising:
identifying, based at least in part on the feedback message, a modulation and coding scheme, a resource block allocation value, or both, for one or more of full duplexing configurations, one or more gap periods, one or more half duplexing configurations, a self-interference value, or a combination thereof.

22. The method of claim 15, further comprising:
identifying a set of configurations available for the UE to use for the subsequent communications; and
transmitting an indication of the set of configurations available for use for the subsequent communications, wherein the feedback message indicates a configuration from the set of configurations.

23. The method of claim 22, wherein the set of configurations comprise a first subset of configurations associated with the HARQ feedback information comprising the negative-acknowledgement indication for the downlink transmission and a second subset of configurations associated with the HARQ feedback information comprising the acknowledgement indication for the downlink transmission.

24. The method of claim 22, wherein the indication is transmitted in a radio resource control (RRC) message, a medium access control (MAC) control element (CE), a downlink control information (DCI) message, or a combination thereof.

25. The method of claim 22, wherein each configuration in the set of configurations comprise a full duplexing configuration, one or more gap periods, a half duplexing configuration, a self-interference value, or a combination thereof.

26. The method of claim 15, wherein the subsequent communications comprise a retransmission of the downlink transmission or a second downlink transmission.

27. An apparatus for wireless communication, comprising:
a user equipment (UE), comprising:
one or more memories storing processor-executable code; and
one or more processors coupled with the one or more memories and individually or collectively operable to execute the code to cause the UE to:
monitor for a downlink transmission from a network device based at least in part on a grant identifying resources for the downlink transmission;
determine hybrid automatic repeat request (HARQ) feedback information for the downlink transmission based at least in part on the monitoring, wherein the HARQ feedback information comprises either an acknowledgement indication or a negative-acknowledgement indication associated with the downlink transmission;
identify, based at least in part on the monitoring or the HARQ feedback information, one or more duplexing parameters to be requested to the network device for subsequent communications between the UE and the network device, the one or more duplexing parameters pertaining to operation of the UE in at least one of a full duplex communications mode or a half duplex communications mode; and
transmit a feedback message indicating the HARQ feedback information and the one or more duplexing parameters to the network device.

28. The apparatus of claim 27, wherein the code to identify the one or more duplexing parameters are further executable by the one or more processors to cause the UE to:
identify, based at least in part on the monitoring or the HARQ feedback information, a full duplex configuration from a set of full duplex configurations to use for the subsequent communications, wherein the one or more duplexing parameters comprise the full duplex configuration.

29. The apparatus of claim 28, wherein the code is further executable by the one or more processors to cause the UE to:
receive, from the network device, control signaling indicating the set of full duplex configurations.

30. An apparatus for wireless communication, comprising:
a network device, comprising:
one or more memories storing processor-executable code; and
one or more processors coupled with the one or more memories and individually or collectively operable to execute the code to cause the network device to:
transmit, to a user equipment (UE), a downlink transmission based at least in part on a grant identifying resources for the downlink transmissions;
receive, from the UE, a feedback message indicating hybrid automatic repeat request (HARQ) feedback information for the downlink transmission, the feedback message also including one or more duplexing parameters pertaining to operation of the UE in at least one of a full duplex communications mode or a half duplex communications mode, wherein the HARQ feedback information comprises either an acknowledgement indication or a negative-acknowledgement indication associated with the downlink transmission; and
transmit subsequent communications to the UE based at least in part on the one or more duplexing parameters.

\* \* \* \* \*